(12) United States Patent
Davis et al.

(10) Patent No.: US 10,734,668 B2
(45) Date of Patent: Aug. 4, 2020

(54) TUBULAR FORM BIOMEDICAL DEVICE BATTERIES

(71) Applicant: Johnson & Johnson Vision Care, Inc., Jacksonville, FL (US)

(72) Inventors: Stuart Michael Davis, Norfolk, MA (US); Frederick A. Flitsch, New Windsor, NY (US); Milburn Ebenezer Jacob Muthu, Jacksonville, FL (US); Randall B. Pugh, St. Johns, FL (US); Adam Toner, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 262 days.

(21) Appl. No.: 15/676,338

(22) Filed: Aug. 14, 2017

(65) Prior Publication Data
US 2018/0076475 A1    Mar. 15, 2018

Related U.S. Application Data

(60) Provisional application No. 62/393,281, filed on Sep. 12, 2016.

(51) Int. Cl.
*H01M 2/08*    (2006.01)
*H01M 10/04*    (2006.01)
(Continued)

(52) U.S. Cl.
CPC ....... *H01M 10/0422* (2013.01); *H01M 2/026* (2013.01); *H01M 2/0267* (2013.01); *H01M 2/08* (2013.01); *H01M 2/204* (2013.01); *H01M 2/208* (2013.01); *H01M 4/38* (2013.01); *H01M 4/50* (2013.01); *H01M 6/12* (2013.01);
(Continued)

(58) Field of Classification Search
CPC .......... H01M 10/0422; H01M 10/049; H01M 2/026; H01M 2/0267; H01M 2/08; H01M 2/204; H01M 2/208; H01M 4/38; H01M 4/50; H01M 6/12; H01M 6/46; H01M 2220/30
See application file for complete search history.

(56) References Cited

U.S. PATENT DOCUMENTS

| 769,874 A | 9/1904 | Paar |
| 2,667,427 A | 1/1954 | Nolte |

(Continued)

FOREIGN PATENT DOCUMENTS

| CN | 104009256 A | 8/2014 |
| CN | 204885327 U | 12/2015 |

(Continued)

OTHER PUBLICATIONS

European Search Report for corresponding EPA No. 17190436.0 dated Nov. 9, 2017.
(Continued)

*Primary Examiner* — Jane J Rhee

(57) ABSTRACT

Designs, strategies and methods for forming tube shaped batteries are described. In some examples, hermetic seals may be used to seal battery chemistry within the tube-shaped batteries. This may improve biocompatibility of energization elements. In some examples, the tube form biocompatible energization elements may be used in a biomedical device. In some further examples, the tube form biocompatible energization elements may be used in a contact lens.

11 Claims, 15 Drawing Sheets

(51) Int. Cl.
*H01M 2/02* (2006.01)
*H01M 2/20* (2006.01)
*H01M 4/50* (2010.01)
*H01M 6/12* (2006.01)
*H01M 6/46* (2006.01)
*H01M 4/38* (2006.01)

(52) U.S. Cl.
CPC .......... *H01M 6/46* (2013.01); *H01M 10/049* (2013.01); *H01M 2220/30* (2013.01)

(56) References Cited

U.S. PATENT DOCUMENTS

| | | | |
|---|---|---|---|
| 3,423,645 | A | 1/1969 | Ruetschi |
| 3,862,488 | A | 1/1975 | Pessell |
| 3,960,596 | A | 6/1976 | Mitoff |
| 4,084,040 | A | 4/1978 | King |
| 4,533,609 | A | 8/1985 | Dey |
| 5,769,874 | A | 6/1998 | Dahlberg |
| 6,224,997 | B1 | 5/2001 | Papadopoulos |
| 2002/0192545 | A1 | 12/2002 | Ramaswami |
| 2003/0017372 | A1 | 1/2003 | Probst et al. |
| 2003/0040781 | A1 | 2/2003 | Larson et al. |
| 2006/0093908 | A1 | 5/2006 | Hwang et al. |
| 2007/0231660 | A1 | 10/2007 | Song |
| 2008/0219487 | A1 | 9/2008 | Gebert et al. |
| 2010/0078837 | A1 | 4/2010 | Pugh et al. |
| 2010/0210745 | A1 | 8/2010 | McDaniel et al. |
| 2012/0235277 | A1 | 9/2012 | Pugh |
| 2013/0026969 | A1 | 1/2013 | Kim |
| 2013/0135578 | A1 | 5/2013 | Pugh |
| 2013/0196214 | A1 | 8/2013 | Scott et al. |
| 2013/0252065 | A1 | 9/2013 | Ueda |
| 2013/0316222 | A1 | 11/2013 | Adharapurapu |
| 2014/0000101 | A1 | 1/2014 | Pugh et al. |
| 2016/0056417 | A1 | 2/2016 | Flitsch et al. |
| 2016/0056496 | A1 | 2/2016 | Otts et al. |
| 2016/0056498 | A1 | 2/2016 | Flitsch et al. |
| 2018/0090726 | A1 | 3/2018 | Thompson |

FOREIGN PATENT DOCUMENTS

| | | |
|---|---|---|
| EP | 2754550 A1 | 7/2014 |
| EP | 2988348 A1 | 2/2016 |
| EP | 2988363 A1 | 2/2016 |
| WO | WO2012033752 A1 | 3/2012 |
| WO | 2015185400 | 12/2015 |
| WO | WO2016014554 A1 | 1/2016 |

OTHER PUBLICATIONS

European Search Report for corresponding EPA No. 17190465.9 dated Dec. 1, 2017.
European Search Report for corresponding EPA No. 17190679.5 dated Nov. 14, 2017.
Singapore Written Opinion Application No. 10201707456T dated Apr. 9, 2018.
Singapore Written Opinion Application No. 10201707402X dated May 16, 2018.
Singapore Written Opinion Application No. 10201707401U dated Dec. 15, 2019.
European Search Report for the Application No. EP17190436, dated Oct. 27, 2017, pp. 3.
European Search Report for the Application No. EP17190465.9, dated Nov. 23, 2017, pp. 3.
European Search Report for the Application No. EP17190679.5, dated Nov. 6, 2017, pp. 4.
RU Search Report for the Application No. RU2017131634, dated Aug. 9, 2018, pp. 5.
RU Search Report for the Application No. RU2017131632, dated Sep. 18, 2018, pp. 2.
RU Search Report for the Application No. RU2017131868, dated Sep. 24, 2018, pp. 3.
Singapore Search Report for the Application No. SG10201707401U, dated Apr. 11, 2018, pp. 5.
Singapore Search Report for the Application No. SG10201707401U, dated May 12, 2018, pp. 6.
Singapore Search Report for the Application No. SG10201707402X, dated May 11, 2018, pp. 4.

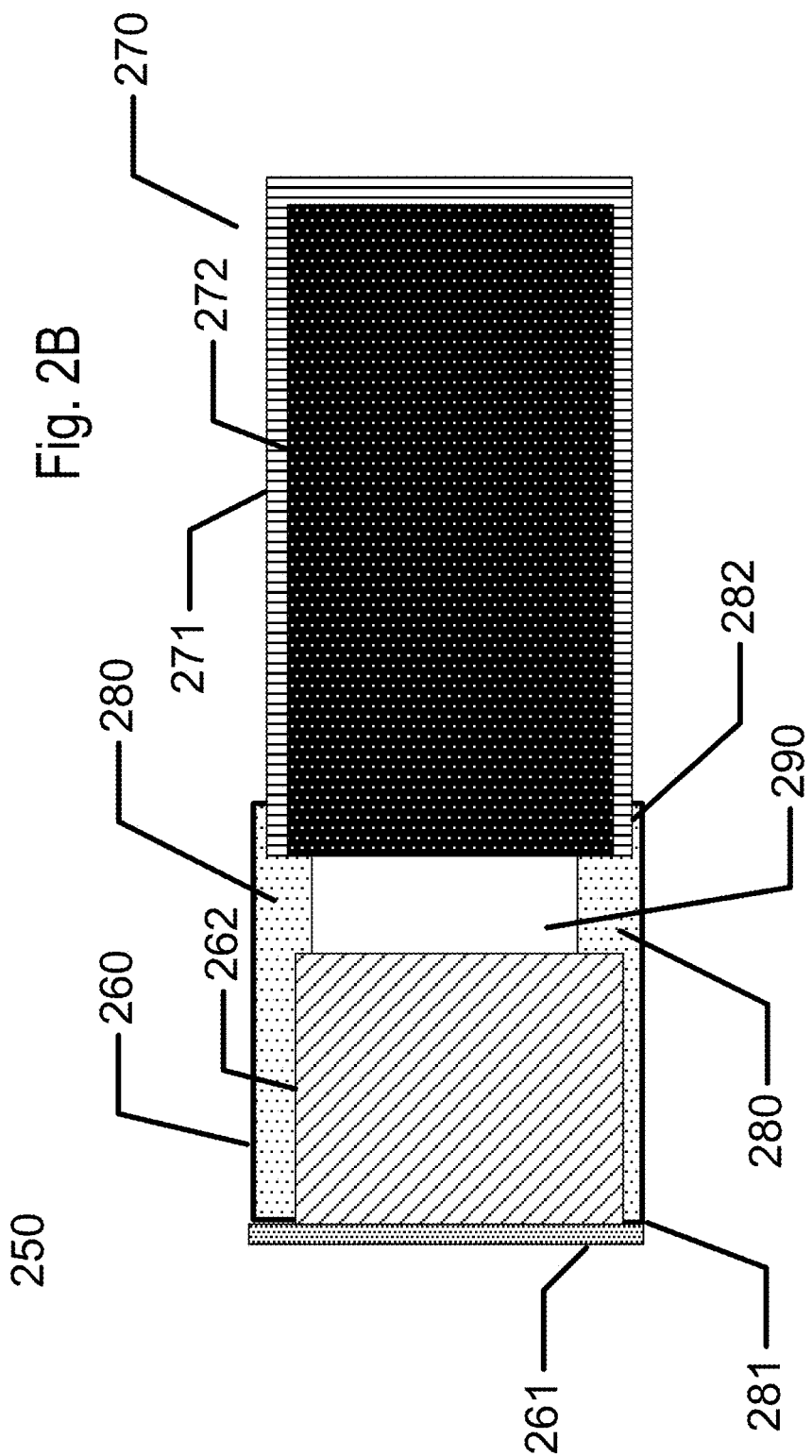

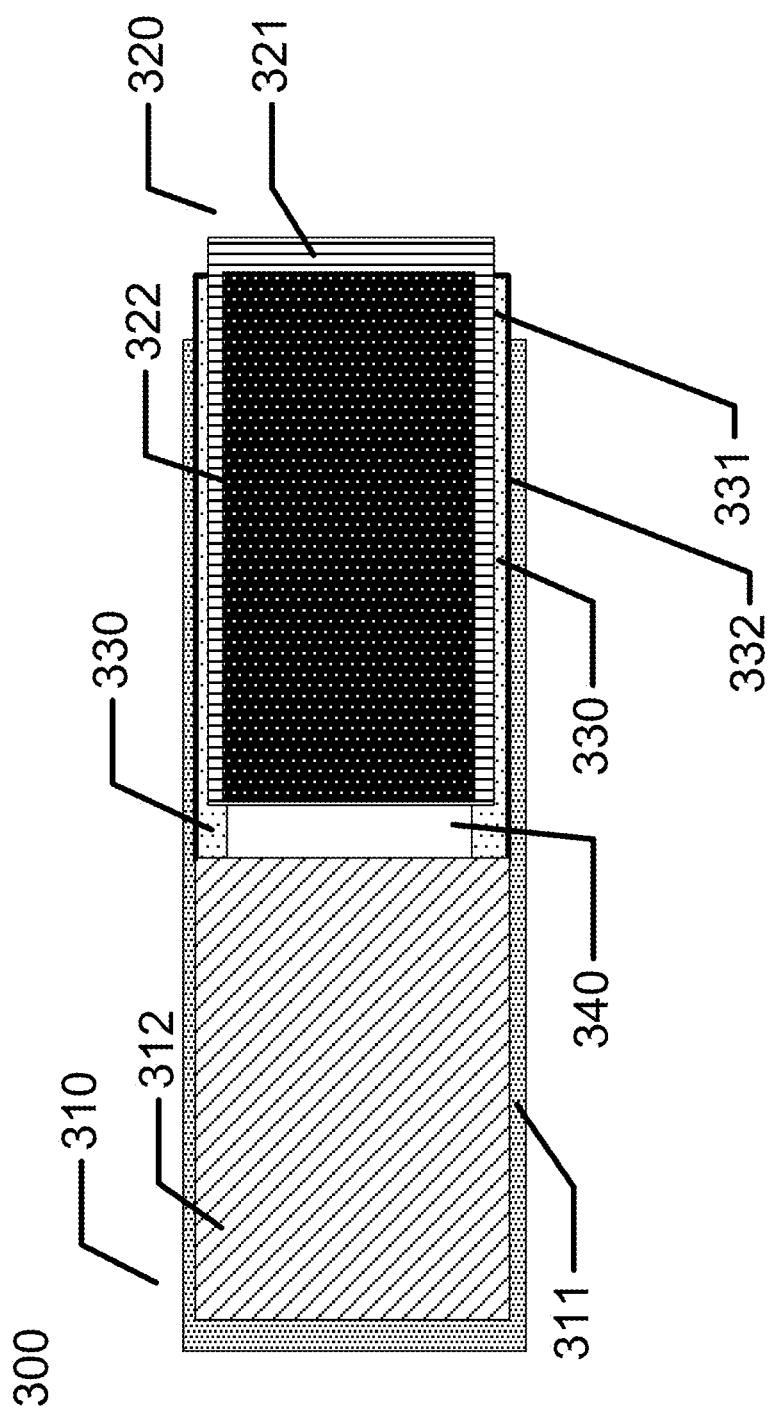

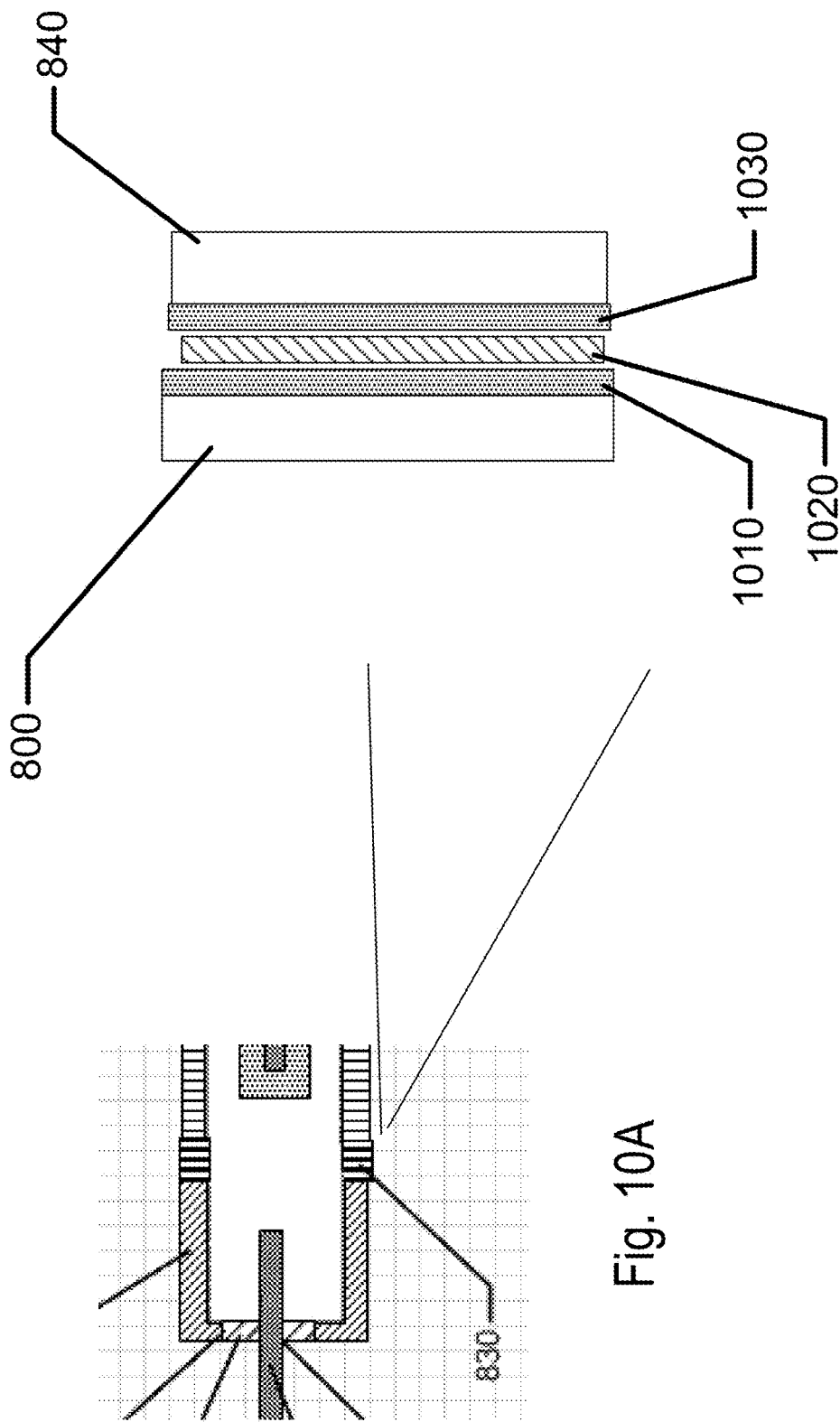

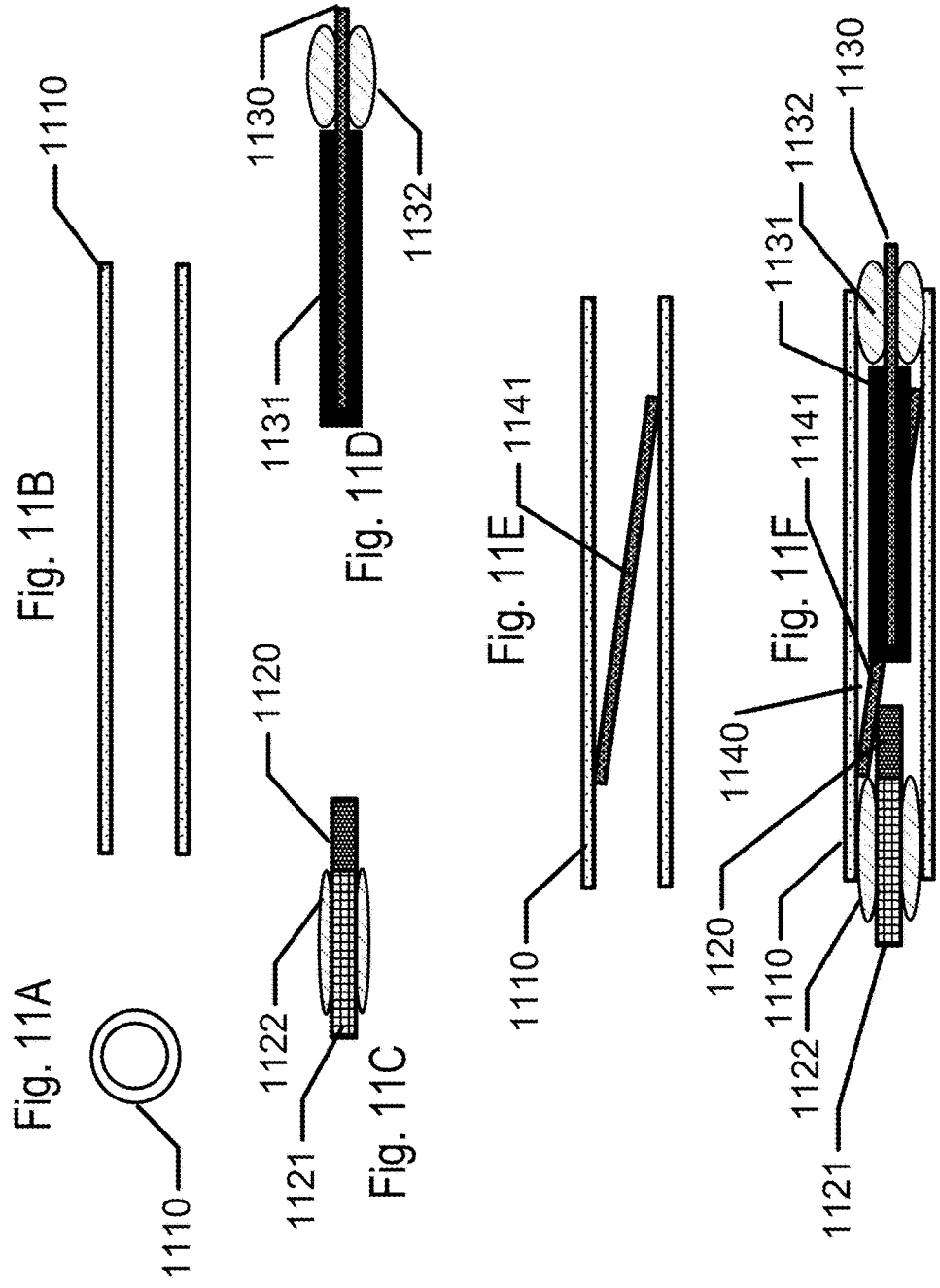

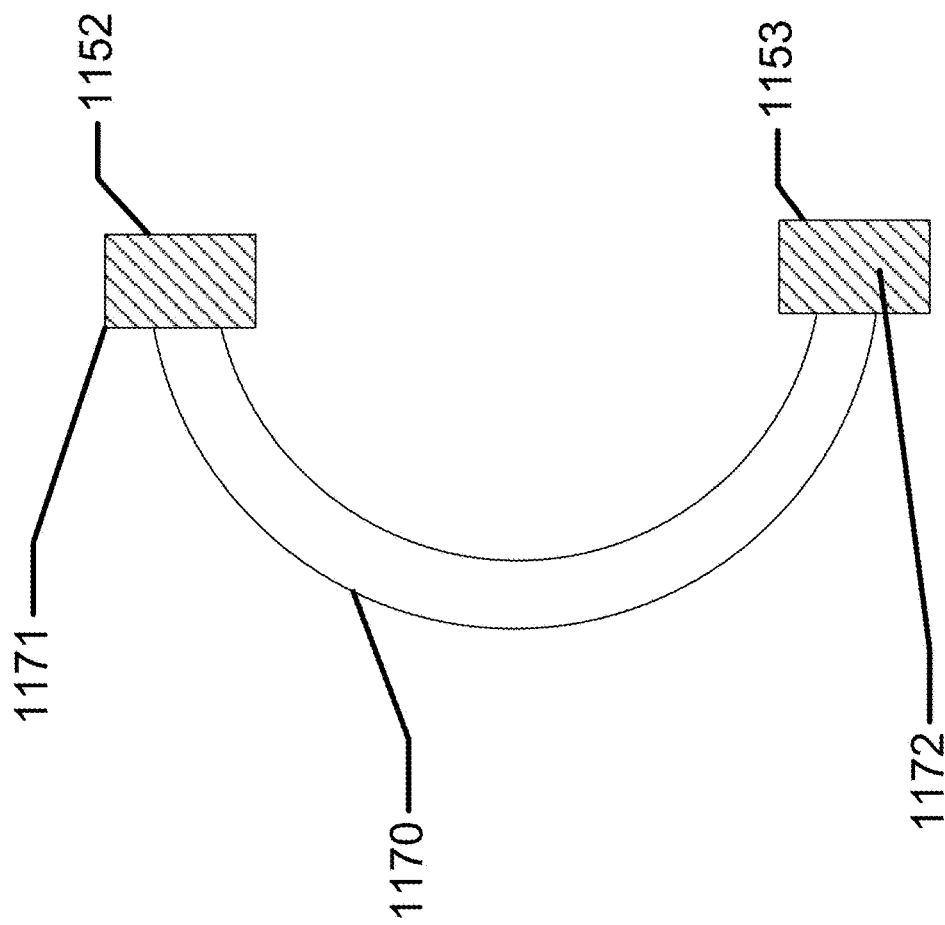

TUBULAR FORM BIOMEDICAL DEVICE BATTERIES

CROSS-REFERENCE TO RELATED APPLICATIONS

This patent application claims the benefit of U.S. Provisional Patent Application No. 62/393,281 filed Sep. 12, 2016.

BACKGROUND OF THE INVENTION

1. Field of the Invention

Designs and methods to improve the biocompatibility aspects of batteries, particularly by forming tubular forms made of solid structures, are described. In some examples, a field of use for the biocompatible batteries may include any biocompatible device or product that requires energy.

2. Description of the Related Art

Recently, the number of medical devices and their functionality has begun to rapidly develop. These medical devices may include, for example, implantable pacemakers, electronic pills for monitoring and/or testing a biological function, surgical devices with active components, contact lenses, infusion pumps, and neurostimulators. Added functionality and an increase in performance to many of the aforementioned medical devices have been theorized and developed. However, to achieve the theorized added functionality, many of these devices now require self-contained energization means that are compatible with the size and shape requirements of these devices, as well as the energy requirements of the new energized components.

Some medical devices may include electrical components such as semiconductor devices that perform a variety of functions and may be incorporated into many biocompatible and/or implantable devices. However, such semiconductor components require energy, and thus energization elements should preferably also be included in such biocompatible devices. The topology and relatively small size of the biocompatible devices may create challenging environments for the definition of various functionalities. In many examples, it may be important to provide safe, reliable, compact and cost-effective means to energize the semiconductor components within the biocompatible devices. Therefore, a need exists for biocompatible energization elements formed for implantation within or upon biocompatible devices where the structure of the millimeter- or smaller-sized energization elements provides enhanced function for the energization element while maintaining biocompatibility.

One such energization element used to power a device may be a battery. When using a battery in biomedical type applications, it may be important that the battery structure and design accommodate aspects of biocompatibility. Therefore, a need exists for novel examples of forming biocompatible batteries for use in biocompatible energization elements that may have significantly improved containment aspects.

SUMMARY OF THE INVENTION

Accordingly, improved containment related strategies and designs for use in biocompatible energization elements are disclosed herein.

One general aspect includes a biomedical device including an electroactive component, a biocompatible battery, and a first encapsulating layer. The biocompatible battery in this aspect includes a tubular structure, with an internal volume forming a cavity. The first encapsulating layer encapsulates at least the electroactive component and the biocompatible battery. In some examples, the first encapsulating layer is used to define a skirt of a contact lens, surrounding internal components of an electroactive lens with a biocompatible layer of hydrogel that interacts with the user's eye surface. In some examples the nature of the electrolyte solution provides improvements to the biocompatibility of the biomedical device. For example, the composition of the electrolyte solution may have lowered electrolyte concentrations than typical battery compositions. In other examples, the composition of electrolytes may mimic the biologic environment that the biomedical device occupies, such as the composition of tear fluid in a non-limiting example. In some examples, the biocompatible battery also includes a plated metallic exterior coating, wherein the plated metallic exterior coating comprises a portion that is plated with electroless plating, and wherein the thickness of the plated metallic exterior coating is thick enough to act as a barrier to ingress and egress of moisture from the biochemical energization element. The electroless plating may include copper based chemistry to deposit a layer of copper in the plated metallic exterior coating. In some examples, there may be a portion of the biocompatible battery wherein a blocking material prevents the plated metallic exterior coating from forming in the region of one or more of the anode contact and the cathode contact.

In accordance with one aspect, the present invention is directed to a biomedical device. The biomedical device comprising an electroactive component; a battery comprising an anode current collector, a cathode current collector, an anode, and a cathode; a tube encapsulating the anode and cathode with a first penetration for the anode current collector, a second penetration for the cathode current collector, a first seal between the tube and the anode current collector and a second seal between the tube and the cathode current collector; and a first biocompatible encapsulating layer, wherein the first biocompatible encapsulating layer encapsulates at least the electroactive component and the battery.

In accordance with another aspect, the present invention is directed to a battery. The battery comprising an anode current collector, wherein the anode current collector is a first metallic tube closed on a first end; an anode, wherein the anode chemistry is contained within the first metallic tube; a cathode current collector, wherein the cathode current collector is a second metallic tube closed on a second end; a cathode, wherein the cathode chemistry is contained within the second metallic tube; a ceramic tube with a first sealing surface that sealably interfaces with the first metallic tube and a second sealing surface that sealably interfaces with the second metallic tube; and a sealing material located in the gap between the first sealing surface and first metallic tube.

In accordance with still another aspect, the present invention is directed to a battery. The battery comprising an anode current collector, wherein the anode current collector is a first metallic tube closed on a first end; an anode, wherein the anode chemistry is contained within the first metallic tube; a cathode current collector, wherein the cathode current collector is a second metallic tube closed on a second end; a cathode, wherein the cathode chemistry is contained within the second metallic tube; a glass tube with a first sealing surface that sealably interfaces with the first metallic tube and a second sealing surface that sealably interfaces with the second metallic tube; and a sealing material located in the gap between the first sealing surface and first metallic tube.

In accordance with still yet another aspect, the present invention is directed to a battery. The battery comprising an anode current collector, wherein the anode current collector is a first metallic tube closed on a first end; an anode, wherein the anode chemistry is contained within the first metallic tube; a cathode current collector, wherein the cathode current collector is wire; a ceramic end cap with a first sealing surface that sealably interfaces with the first metallic tube and a second sealing surface that sealably interfaces with the cathode current collector; a cathode, wherein the cathode chemistry is deposited upon the cathode current collector; and a sealing material located in the gap between the first sealing surface and first metallic tube.

In accordance with yet still another aspect, the present invention is directed to a battery. The battery comprising an anode current collector, wherein the anode current collector is a first semiconductor tube closed on a first end and doped on the first end; an anode, wherein the anode chemistry is contained within the first semiconductor tube; a cathode current collector, wherein the cathode current collector is a second semiconductor tube closed on a second end and doped on the second end; a cathode, wherein the cathode chemistry is deposited upon the cathode current collector; and a sealing material located in a gap between the first semiconductor tube and the second semiconductor tube.

In accordance with another aspect, the present invention is directed to a method of manufacturing a battery. The method comprising obtaining a cathode collector tube; filling the cathode collector tube with cathode chemicals; obtaining an anode collector tube; filling the anode collector tube with anode chemicals; obtaining a tube form ceramic insulator piece; forming a first and second sealing surface on each end of the tube form ceramic insulator piece; evaporating a metal film upon the first and second sealing surface; coating the end of the cathode collector tube with a piece of Nanofoil® material; coating the metal film upon the first and second sealing surface with a solder paste; pushing the cathode collector tube over the first sealing surface; activating the Nanofoil® material to cause a rapid temperature increase at the interface between the cathode collector tube and the first sealing surface and melting the solder paste.

Implementations of the above-described batteries may include one or more of the following features, a sealing material located in a gap between the first sealing surface of a ceramic, semiconductor crystal or glass material and a metallic tube or another ceramic, semiconductor or glass material.

The battery examples may also include the battery where the sealing material located in the gap between the first sealing surface and the first tube includes an epoxy adhesive. The battery examples may also include the battery where the sealing material located in the gap between the first sealing surface and the first tube includes an epoxy adhesive. The battery may also include the battery where the sealing material located in the gap between the first sealing surface and the first tube includes a first layer including molybdenum and manganese particles in a mixture with ceramic powders which is then plated with a metallic film. The battery where the sealing material located in the gap between the first sealing surface and the first tube includes a first layer including molybdenum and manganese particles in a mixture with ceramic powders which is then plated with a metallic film. The battery may also include the battery where the metallic film includes nickel.

In some examples, the battery examples include the battery where the sealing material located in the gap between the first sealing surface and the first metallic tube includes a first layer of a PVD deposited metallic film. The battery may also include the battery where the metallic film includes titanium. The battery may also include the battery where a noble metallic film is additionally deposited upon the PVD deposited metallic film.

The battery examples may also include the battery where the sealing material located in the gap between the first sealing surface and the first tube includes a plurality of thin layers of metallic films, where a first thin layer of metallic film is deposited upon a second layer of metallic film, where the first thin layer of metallic film is chemically reactive with the second layer of metallic film releasing energy to rapidly heat the layers, and where the chemical reaction is activated by an energetic pulse of energy. In some examples, the energetic pulse includes photons. In some examples, the energetic pulse includes electrons. In some examples, the energetic pulse includes thermal energy.

In some examples, the battery may also include the battery where the sealing material located in the gap between the first sealing surface and the first tube includes a conventional solder alloy base with an addition of titanium, where the titanium reacts with surface materials of the first sealing surface upon exposure to ultrasonic energy.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 2A-2B illustrate an exemplary tubular form with metal containment and insulator components in a tubular battery design.

FIG. 3 illustrates an exemplary tubular form with interpenetrating metal containment and insulator components in a tubular battery design.

FIG. 10A illustrates a close-up of an exemplary seal.

FIG. 10B illustrates a structure incorporating solder coated surfaces and heating foil.

FIGS. 11A-11E illustrate side cross sectional views of components of an exemplary fully formed tubular form.

FIG. 11F illustrates a cross-sectional view of an exemplary fully formed tubular form.

FIG. 11J illustrates the blocking of portions of the exemplary tubular form battery with plater's tape to inhibit plating in those regions.

DETAILED DESCRIPTION OF THE INVENTION

Figure 1A:
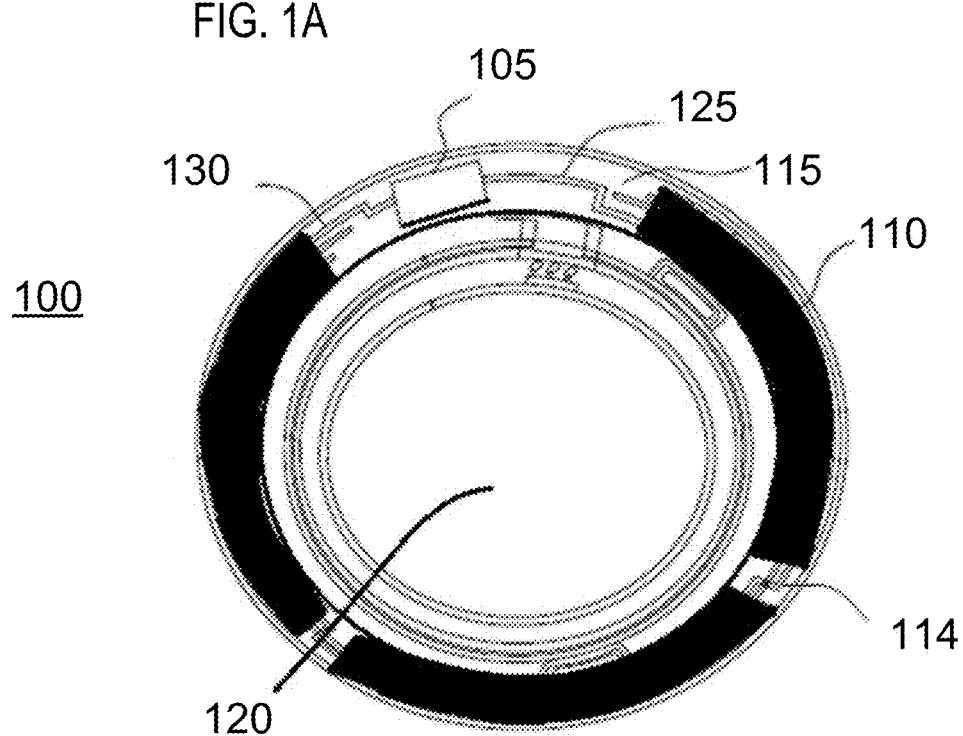
FIGS. 1A-1B illustrate exemplary aspects of energization elements in concert with the exemplary application of contact lenses.

Methods of forming tube form batteries with improved biocompatibility are disclosed in the present application. In the following sections, detailed descriptions of various examples are described. The descriptions of examples are exemplary embodiments only, and various modifications and alterations may be apparent to those skilled in the art. Therefore, the examples do not limit the scope of this application. In some examples, these biocompatible batteries may be designed for use in, or proximate to, the body of a living organism.

Glossary

In the description and claims below, various terms may be used for which the following definitions will apply:

"Anode" as used herein refers to an electrode through which electric current flows into a polarized electrical device. The direction of electric current is typically opposite to the direction of electron flow. In other words, the electrons flow from the anode into, for example, an electrical circuit.

Battery as used herein refers to an electrochemical power source which consists of a single electrochemical cell or a multiplicity of electrochemical cells, suitably connected together to furnish a desired voltage or current. The cells may be primary (non-rechargeable) or secondary (rechargeable) cells.

"Binder" as used herein refers to a polymer that is capable of exhibiting elastic responses to mechanical deformations and that is chemically compatible with other energization element components. For example, binders may include electroactive materials, electrolytes, polymers, etc. In some examples, binder may refer to a substance that holds particles and/or particles+liquid together in a cohesive mass.

"Biocompatible" as used herein refers to a material or device that performs with an appropriate host response in a specific application. For example, a biocompatible device does not have toxic or injurious effects on biological systems.

"Cathode" as used herein refers to an electrode through which electric current flows out of a polarized electrical device. The direction of electric current is typically opposite to the direction of electron flow. Therefore, the electrons flow into the cathode of the polarized electrical device, and out of, for example, the connected electrical circuit.

"Coating" as used herein refers to a deposit of material in thin forms. In some uses, the term will refer to a thin deposit that substantially covers the surface of a substrate it is formed upon. In other more specialized uses, the term may be used to describe small thin deposits in smaller regions of the surface.

"Electrode" as used herein may refer to an active mass in the energy source. For example, it may include one or both anode and cathode.

"Energized" as used herein refers to the state of being able to supply electrical current or to have electrical energy stored within.

"Energy" as used herein refers to the capacity of a physical system to do work. Many uses of the energization elements may relate to the capacity of being able to perform electrical actions.

"Energy Source" or "Energization Element" or "Energization Device" as used herein refers to any device or layer which is capable of supplying energy or placing a logical or electrical device in an energized state. The energization elements may include batteries. The batteries may be formed from alkaline type cell chemistry and may be solid-state batteries or wet cell batteries including aqueous alkaline, aqueous acid or aqueous salt electrolyte chemistry or non-aqueous chemistries, molten salt chemistry or solid state chemistry. The batteries may be dry cell (immobilized electrolyte) or wet cell (free, liquid electrolyte) types.

"Fillers" as used herein refer to one or more energization element separators that do not react with either acid or alkaline electrolytes. Generally, fillers may include substantially water insoluble materials such as carbon black; coal dust; graphite; metal oxides and hydroxides such as those of silicon, aluminum, calcium, magnesium, barium, titanium, iron, zinc, and tin; metal carbonates such as those of calcium and magnesium; minerals such as mica, montmorollonite, kaolinite, attapulgite, and talc; synthetic and natural zeolites such as Portland cement; precipitated metal silicates such as calcium silicate; hollow or solid polymer or glass microspheres, flakes and fibers; and the like.

"Functionalized" as used herein refers to making a layer or device able to perform a function including, for example, energization, activation, and/or control.

"Mold" as used herein refers to a rigid or semi-rigid object that may be used to form three-dimensional objects from uncured formulations. Some exemplary molds include two mold parts that, when opposed to one another, define the structure of a three-dimensional object.

"Power" as used herein refers to work done or energy transferred per unit of time.

"Rechargeable" or "Re-energizable" as used herein refer to a capability of being restored to a state with higher capacity to do work. Many uses may relate to the capability of being restored with the ability to flow electrical current at a certain rate for certain, reestablished time periods.

"Reenergize" or "Recharge" as used herein refer to restoring to a state with higher capacity to do work. Many uses may relate to restoring a device to the capability to flow electrical current at a certain rate for a certain reestablished time period.

"Released" as used herein and sometimes referred to as "released from a mold" means that a three-dimensional object is either completely separated from the mold, or is only loosely attached to the mold, so that it may be removed with mild agitation.

"Stacked" as used herein means to place at least two component layers in proximity to each other such that at least a portion of one surface of one of the layers contacts a first surface of a second layer. In some examples, a coating, whether for adhesion or other functions, may reside between the two layers that are in contact with each other through said coating.

"Traces" as used herein refer to energization element components capable of connecting together the circuit components. For example, circuit traces may include copper or gold when the substrate is a printed circuit board and may typically be copper, gold or printed film in a flexible circuit.

A special type of trace is the current collector. Current collectors are traces with electrochemical compatibility that make the current collectors suitable for use in conducting electrons to and from a cathode or anode of an electrochemical cell.

There may be other examples of how to assemble and configure batteries according to the present invention, and some may be described in following sections. However, for many of these examples, there are selected parameters and characteristics of the batteries that may be described in their own right. In the following sections, some characteristics and parameters will be focused upon.

Exemplary Biomedical Device Construction with Biocompatible Energization Elements An example of a biomedical device that may incorporate the energization elements, batteries, of the present invention may be an electroactive focal-adjusting contact lens. Referring to FIG. 1A, an example of such a contact lens insert may be depicted as contact lens insert 100. In the contact lens insert 100, there may be an electroactive element 120 that may accommodate focal characteristic changes in response to controlling voltages. A circuit 105, to provide those controlling voltage signals as well as to provide other functions such as controlling sensing of the environment for external control signals, may be powered by a biocompatible battery element 110. As depicted in FIG. 1A, the battery element 110 may be found as multiple major pieces, in this case three pieces, and may include the various configurations of battery chemistry elements as has been discussed. The battery elements 110 may have various interconnect features to join together pieces as may be depicted underlying the region of interconnect 114. The battery elements 110 may be connected to the circuit element 105 that may have its own substrate 115 upon which interconnect features 125 may be located. The circuit 105, which may be in the form of an integrated circuit, may be electrically and physically connected to the substrate 115 and its interconnect features 125.

Figure 1B:
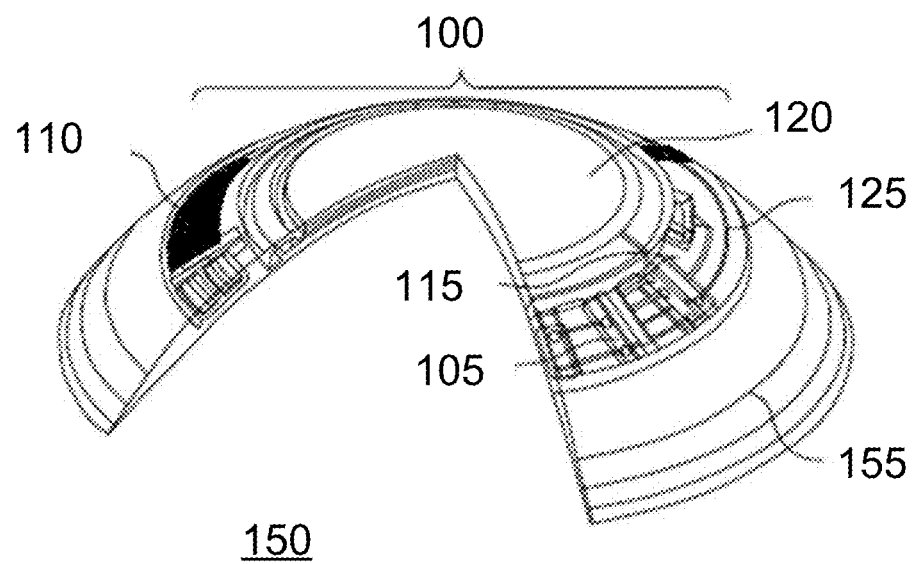

Referring to FIG. 1B, a cross sectional relief of a contact lens 150 may comprise contact lens insert 100 and its discussed constituents. The contact lens insert 100 may be encapsulated into a skirt of contact lens hydrogel 155 which may encapsulate the contact lens insert 100 and provide a comfortable interface of the contact lens 150 to a user's eye.

Electrical Requirements of Microbatteries

Another area for design considerations may relate to the electrical requirements of the device, which may be provided by the battery. In order to function as a power source for a medical device, an appropriate battery may need to meet the full electrical requirements of the system when operating in a non-connected or non-externally powered mode. An emerging field of non-connected or non-externally powered biomedical devices may include, for example, vision-correcting contact lenses, health monitoring devices, pill cameras, and novelty devices. Recent developments in integrated circuit (IC) technology may permit meaningful electrical operation at very low current levels, for example, picoamps of standby current and microamps of operating current. IC's may also permit very small devices.

Microbatteries for biomedical applications may be required to meet many simultaneous, challenging requirements. For example, the microbattery may be required to have the capability to deliver a suitable operating voltage to an incorporated electrical circuit. This operating voltage may be influenced by several factors including the IC process "node," the output voltage from the circuit to another device, and a particular current consumption target which may also relate to a desired device lifetime.

With respect to the IC process, nodes may typically be differentiated by the minimum feature size of a transistor, such as its "so-called" transistor channel. This physical feature, along with other parameters of the IC fabrication, such as gate oxide thickness, may be associated with a resulting rating standard for "turn-on" or "threshold" voltages of field-effect transistors (FET's) fabricated in the given process node. For example, in a node with a minimum feature size of 0.5 microns, it may be common to find FET's with turn-on voltages of 5.0V. However, at a minimum feature size of 90 nm, the FET's may turn-on at 1.2, 1.8, and 2.5V. The IC foundry may supply standard cells of digital blocks, for example, inverters and flip-flops that have been characterized and are rated for use over certain voltage ranges. Designers chose an IC process node based on several factors including density of digital devices, analog/digital mixed signal devices, leakage current, wiring layers, and availability of specialty devices such as high-voltage FET's. Given these parametric aspects of the electrical components, which may draw power from a microbattery, it may be important for the microbattery power source to be matched to the requirements of the chosen process node and IC design, especially in terms of available voltage and current.

In some examples, an electrical circuit powered by a microbattery, may connect to another device. In non-limiting examples, the microbattery-powered electrical circuit may connect to an actuator or a transducer. Depending on the application, these may include a light-emitting diode (LED), a sensor, a microelectromechanical system (MEMS) pump, or numerous other such devices. In some examples, such connected devices may require higher operating voltage conditions than common IC process nodes. For example, a variable-focus lens may require 35V to activate. The operating voltage provided by the battery may therefore be a critical consideration when designing such a system. In some examples of this type of consideration, the efficiency of a lens driver to produce 35V from a 1V battery may be significantly less than it might be when operating from a 2V battery. Further requirements, such as die size, may be dramatically different considering the operating parameters of the microbattery as well.

Individual battery cells may typically be rated with open-circuit, loaded, and cutoff voltages. The open-circuit voltage is the potential produced by the battery cell with infinite load resistance. The loaded voltage is the potential produced by the cell with an appropriate, and typically also specified, load impedance placed across the cell terminals. The cutoff voltage is typically a voltage at which most of the battery has been discharged. The cutoff voltage may represent a voltage, or degree of discharge, below which the battery should not be discharged to avoid deleterious effects such as excessive gassing. The cutoff voltage may typically be influenced by the circuit to which the battery is connected, not just the battery itself, for example, the minimum operating voltage of the electronic circuit. In one example, an alkaline cell may have an open-circuit voltage of 1.6V, a loaded voltage in the range 1.0 to 1.5V, and a cutoff voltage of 1.0V. The voltage of a given microbattery cell design may depend upon other factors of the cell chemistry employed. And, different cell chemistry may therefore have different cell voltages.

Cells may be connected in series to increase voltage; however, this combination may come with tradeoffs to size, internal resistance, and battery complexity. Cells may also be combined in parallel configurations to decrease resistance and increase capacity; however, such a combination may tradeoff size and shelf life.

Battery capacity may be the ability of a battery to deliver current, or do work, for a period of time. Battery capacity may typically be specified in units such as microamp-hours. A battery that may deliver 1 microamp of current for 1 hour has 1 microamp-hour of capacity. Capacity may typically be increased by increasing the mass (and hence volume) of reactants within a battery device; however, it may be appreciated that biomedical devices may be significantly constrained on available volume. Battery capacity may also be influenced by electrode and electrolyte material as well as other factors such as the physical design of the electrodes, the nature and dimensions of any separator material disposed between the electrodes and the relative proportions of anode, cathode active materials, conductive aids and electrolyte.

Depending on the requirements of the circuitry to which the battery is connected, a battery may be required to source current over a range of values. During storage prior to active use, a leakage current on the order of picoamps to nanoamps may flow through circuits, interconnects, and insulators. During active operation, circuitry may consume quiescent current to sample sensors, run timers, and perform such low power consumption functions. Quiescent current consumption may be on the order of nanoamps to milliamps. Circuitry may also have even higher peak current demands, for example, when writing flash memory or communicating over radio frequency (RF). This peak current may extend to tens of milliamps or more. The resistance and impedance of a microbattery device may also be important to design considerations.

Shelf life typically refers to the period of time which a battery may survive in storage and still maintain useful operating parameters. Shelf life may be particularly important for biomedical devices for several reasons. Electronic devices may displace non-powered devices, as for example may be the case for the introduction of an electronic contact lens. Products in these existing market spaces may have established shelf life requirements, for example, three years, due to customer, supply chain, and other requirements. It may typically be desired that such specifications not be altered for new products. Shelf life requirements may also be set by the distribution, inventory, and use methods of a device including a microbattery. Accordingly, microbatteries for biomedical devices may have specific shelf life requirements, which may be, for example, measured in the number of years.

In some examples, three-dimensional biocompatible energization elements may be rechargeable. For example, an inductive coil may also be fabricated on the three-dimensional surface. The inductive coil could then be energized with a radio-frequency ("RF") fob. The inductive coil may be connected to the three-dimensional biocompatible energization element to recharge the energization element when RF is applied to the inductive coil. In another example, photovoltaics may also be fabricated on the three-dimensional surface and connected to the three-dimensional biocompatible energization element. When exposed to light or photons, the photovoltaics will produce electrons to recharge the energization element.

In some examples, a battery may function to provide the electrical energy for an electrical system. In these examples, the battery may be electrically connected to the circuit of the electrical system. The connections between a circuit and a battery may be classified as interconnects. These interconnects may become increasingly challenging for biomedical microbatteries due to several factors. In some examples, powered biomedical devices may be very small thus allowing little area and volume for the interconnects. The restrictions of size and area may impact the electrical resistance and reliability of the interconnections.

In other respects, a battery may contain a liquid electrolyte which could boil at high temperature. This restriction may directly compete with the desire to use a solder interconnect which may, for example, require relatively high temperatures such as 250 degrees Celsius to melt. Although in some examples, the battery chemistry, including the electrolyte, and the heat source used to form solder based interconnects, may be isolated spatially from each other. In the cases of emerging biomedical devices, the small size may preclude the separation of electrolyte and solder joints by sufficient distance to reduce heat conduction.

Modular Battery Components

In some examples, a modular battery component may be formed according to some aspects and examples of the present invention. In these examples, the modular battery assembly may be a separate component from other parts of the biomedical device. In the example of an ophthalmic contact lens device, such a design may include a modular battery that is separate from the rest of a media insert. There may be numerous advantages of forming a modular battery component. For example, in the example of the contact lens, a modular battery component may be formed in a separate, non-integrated process which may alleviate the need to handle rigid, three-dimensionally formed optical plastic components. In addition, the sources of manufacturing may be more flexible and may operate in a more parallel mode to the manufacturing of the other components in the biomedical device. Furthermore, the fabrication of the modular battery components may be decoupled from the characteristics of three-dimensional (3D) shaped devices. For example, in applications requiring three-dimensional final forms, a modular battery system may be fabricated in a flat or roughly two-dimensional (2D) perspective and then shaped to the appropriate three-dimensional shape. In some examples, the battery may be small enough to not perturb a three-dimensional shape even if it is not bent. In some other examples, a coupling of multiple small batteries may fit into a three dimensionally shaped space. A modular battery component may be tested independently of the rest of the biomedical device and yield loss due to battery components may be sorted before assembly. The resulting modular battery component may be utilized in various media insert constructs that do not have an appropriate rigid region upon which the battery components may be formed; and, in a still further example, the use of modular battery components may facilitate the use of different options for fabrication technologies than might otherwise be utilized, such as, web-based technology (roll to roll), sheet-based technology (sheet-to-sheet), printing, lithography, and "squeegee" processing. In some examples of a modular battery, the discrete containment aspect of such a device may result in additional material being added to the overall biomedical device construct. Such effects may set a constraint for the use of modular battery solutions when the available space parameters require minimized thickness or volume of solutions.

Tubes as Design Elements in Battery Component Design

In some examples, battery elements may be designed in manners that segment the regions of active battery chemistry with robust seals. In some examples these seals may be hermetic. There may be numerous advantages from the division of the active battery components into hermetically sealed segments which may commonly take the shape as tubes. Tubular form batteries with external components made of metals, glasses or ceramics may form an ideal architectural design aspect. In some examples, the materials may be chosen such that seals that are formed between the materials may be considered "hermetic" in that the diffusion of molecules across the seal may be beneath a specification under a test protocol for the "type of seal, or the type of process used to create the seal." For example, electronic components such as batteries may have a volume of air or a volume "equivalent to an amount of air" within them, and a hermetic specification may relate to a seal having a leak rate less than a certain level that would replace 50% of the volume of the device with air from outside the seal. A large form of a tubular battery may be formed by one or more of the processes to be discussed in coming sections of the specification where a low level of leak may be measured to determine the seal is hermetic for the given battery. In practice, small tube batteries or microbatteries such as those according to the present disclosure may have a volume on the order of $10^{-4}$ cm$^3$ in some examples. The ability of leak detection equipment to measure a sufficiently low leak rate to ascertain that a seal of the microbattery is "hermetic" may beyond the current technology of leak detection; nevertheless, the seal of the microbattery may be termed hermetic because the same processing and materials when applied to a large form of the battery results in a measurably low leak rate sufficient to deem the seal processing and materials to be "hermetic"

Figure 2A:
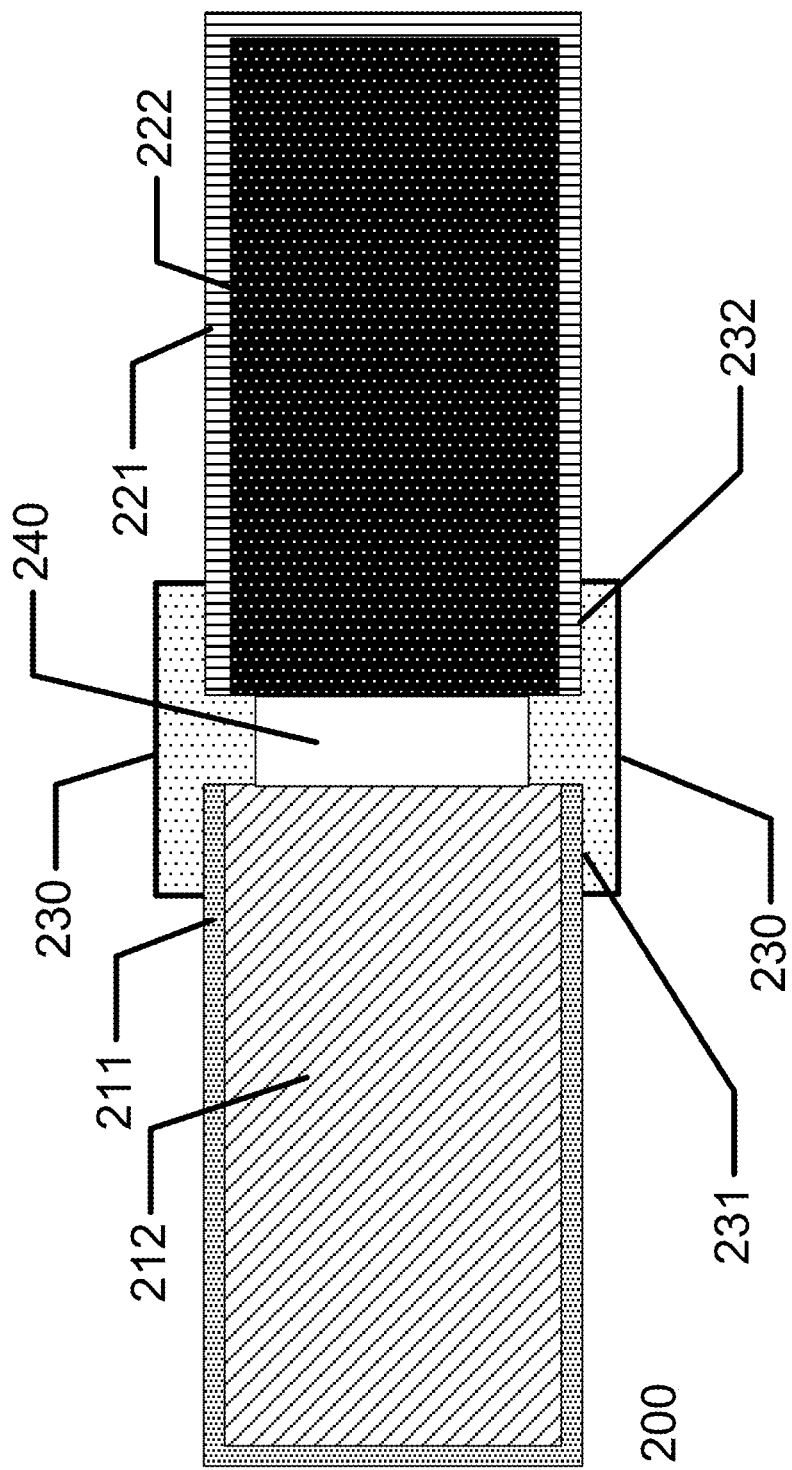

Referring to FIG. 2A, a basic example of a tubular form battery, a basic metal casing with insulator battery 200 may be found. In the example, two metal components, the anode contact 211 and the cathode contact 221 form metal tubes that surround the material. The anode chemicals 212 may be located within the anode contact 211. And, the cathode chemicals 222 may be located within the cathode contact 221. In some examples, the cathode chemicals 222 and the anode chemicals 212 may be separated by a separator 240. The battery contacts need to be isolated from each other to form a functional battery, since electrical connection would cause the battery chemistry to be exhausted. In the basic example of FIG. 2A, an insulator 230 electrically separates the anode and cathode.

As illustrated, the insulator 230 may be a physical piece which itself acts in the containment of material within the battery and as part of the diffusion barrier to inhibit chemical transfer into or out of the battery. In a latter section, description of various types of seals including hermetic seals and techniques to form them is discussed. Examples of seals in the example of FIG. 2A may be metal to ceramic or metal to glass seals. The example of FIG. 2A has at least two of these seals at seal 231 and seal 232 for example.

Referring now to FIG. 2B, an alternative tube form battery 250 with a similar structure to the device of FIG. 2A is illustrated. The alternative tube form battery 250 may have an anode region 260 with an anode contact 261 and anode chemicals 262. It may also have a cathode region 270 with a metallic tube form containing the cathode chemicals 272 and defining a cathode contact 271. The insulator piece 280 that separates the anode contact 261 and the cathode contact 271 may have insulator to metal seals as illustrated at seal 281 and seal 282. As in the example of FIG. 2A the insulator to metal seals may be hermetic seals in some examples. The insulator may electrically separate the anode 260 and the cathode 270 but the separator 290 may physically separate the anode 260 and the cathode 270. In this second example, there are again solid materials comprising the anode contact, the cathode contact and the insulator device which significantly block diffusion of molecules and atoms across their boundary. Hermetic seals at seal 281 and seal 282 may result in an overall hermetically sealed tube form battery.

Referring now to FIG. 3, another example of a tube form battery is illustrated. In an overlapping tube form battery 300, a metal can over either the anode or the cathode may significantly overlap an insulator piece which may be significantly underlapped by a metal can over the other region of the battery. Specifically, in the illustrated form, the anode 310 has a metal can which also acts as the anode contact 311 and surrounds the anode chemicals 312. The metal can of the anode, in the illustrated design also significantly overlaps the insulator piece 330 which itself is significantly underlapped by the metal can of the cathode region 320. The cathode metal can surrounds the cathode chemicals 322 and is the cathode contact 321. The cathode chemicals 322 and the anode chemicals 312 are physically separated in the example by the separator 340. In the tube illustrations either or both of the anode or cathode chemicals may be depicted in a block form, for illustration; whereas in some examples the physical form may resemble the illustration, in other examples the actual chemicals may be films that coat a portion of the space. The example of the overlapping tube form battery 300 may demonstrate a maximum amount of sealing surfaces between the metal and the insulator pieces. These seals are depicted at seal 331 and seal 332 which as can be seen overlap a significant fraction of the size of the tube battery.

Figure 4:
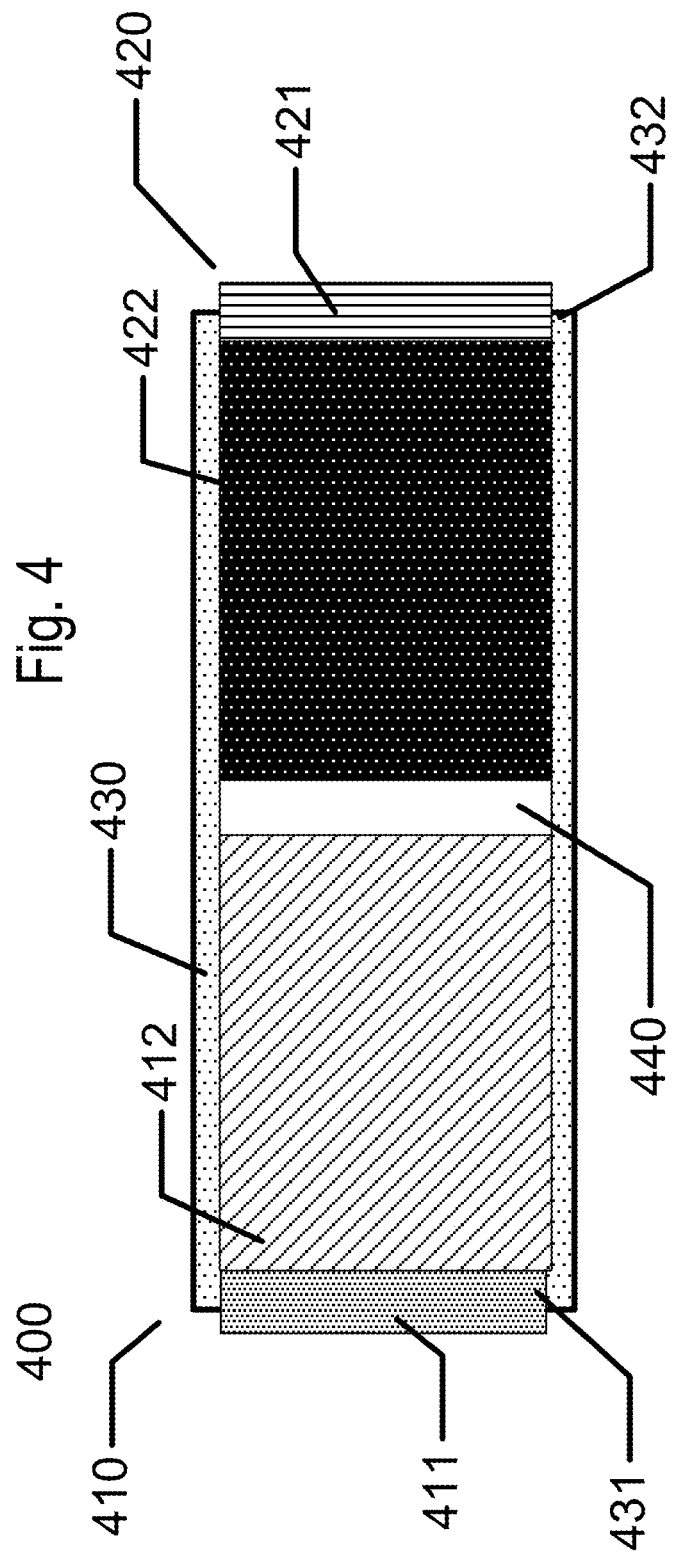
FIG. 4 illustrates an exemplary tubular form with metal endcap containment and insulator components in a tubular battery design.

Referring to FIG. 4 an alternative tubular form 400 is illustrated. In examples of this type, a center insulating piece 430 interfaces with metal endcaps for the external contacts. The exemplary anode region 410 may include an anode metal contact 411 and anode chemicals 412. A seal 431 of the center insulator piece 430 may be made to the anode metal contact 411. In the exemplary cathode region 420 there may be a cathode metal contact 421 and cathode chemicals 422 as well as a seal 432 between the center insulator piece 430 and the cathode metal contact 421. This type of configuration may have the least area for a seal to act on of the various examples. The center insulating piece, electrically separates the cathode and anode contact, a separator 440 physically separates the anode chemicals 412 and cathode chemicals 422.

Figure 5:
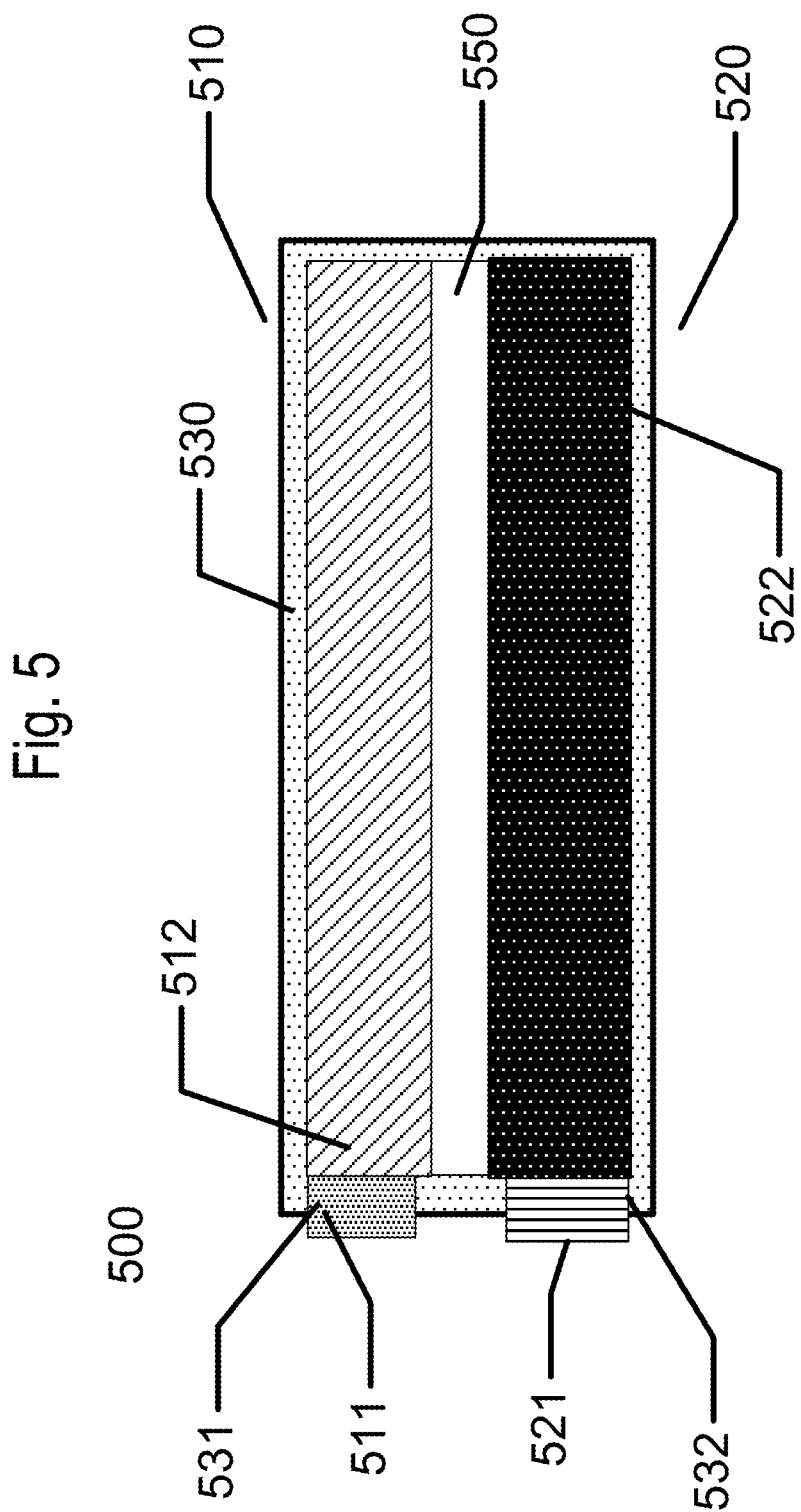
FIG. 5 illustrates an exemplary tubular form with insulator containment metal contacts in a tubular battery design with cofacial anode and cathode components.

Referring to FIG. 5 an alternative tubular form battery 500 is illustrated with a lateral layout of the anode and cathode chemicals. Such a layout may still be formed in a tube microbattery format and may afford the highest cross sectional area for the separator 550 interfacing and separating the anode chemicals 512 from the cathode chemicals 522. In the illustration, the top region may be the anode region 510 with anode chemicals 512 and an anode contact 511 and an anode seal 531 around the anode contact 511. In some examples a single piece of insulator 530 may be formed with holes on one end for the anode and cathode contacts, in some other examples there may be two insulator pieces or more, where the top piece may be a separate piece with holes for the anode and cathode contacts. In the illustration, the bottom region may be the cathode region 520 with cathode chemicals 522, a cathode contact 521 and a cathode seal 532 around the cathode contact 521.

Figure 6:
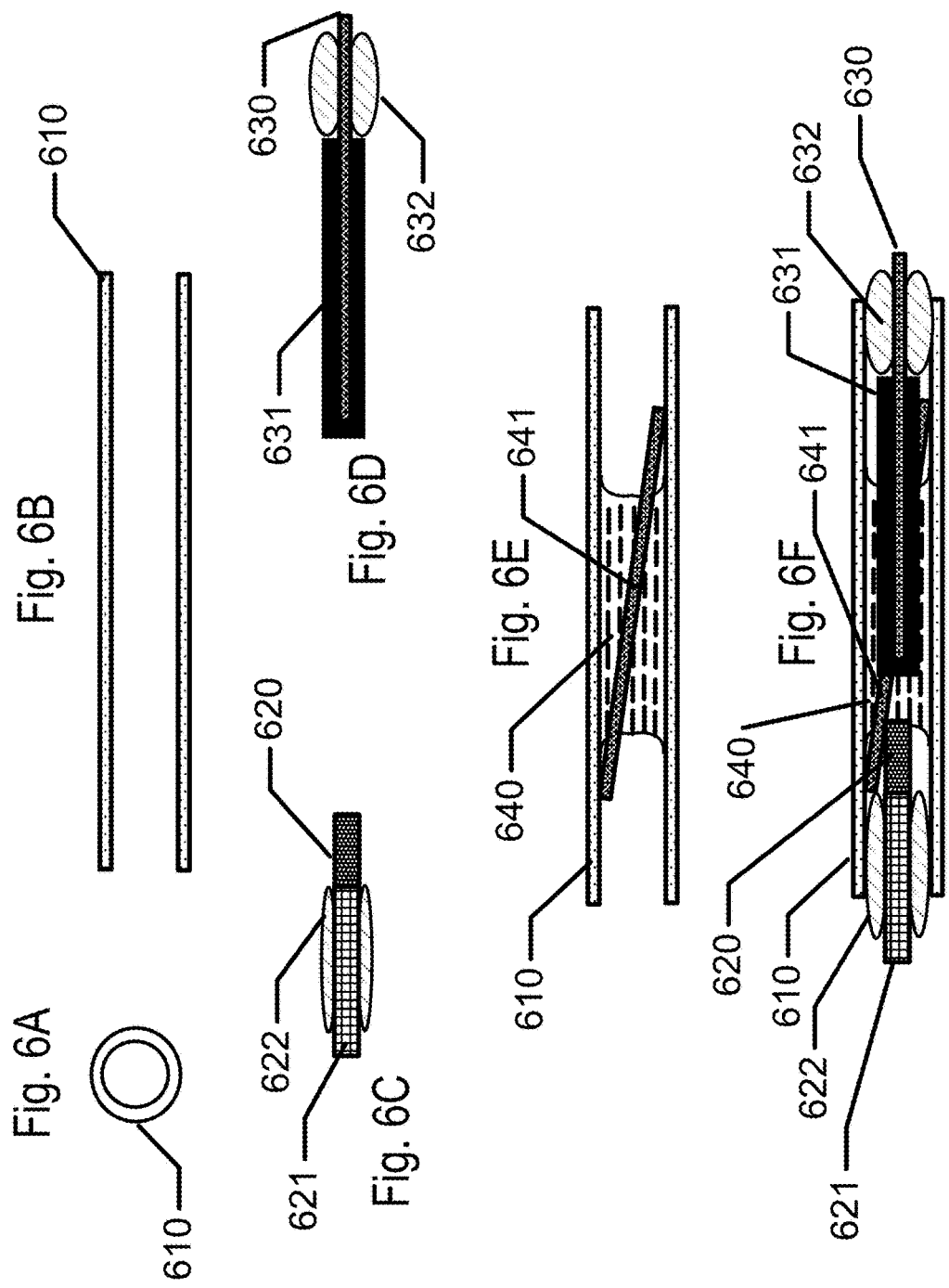
FIGS. 6A-6F illustrate the formation of a tubular body in accordance with the present invention.

Referring to FIGS. 6A-6F the of formation of a tube form battery is illustrated. A tube 610 in FIG. 6A of an insulating material such as a glass or ceramic may be cut to a desired length as illustrated in FIG. 6B. In some examples the glass may include Borosilicate, sealing glasses for Kovar and other metals, quartz, soda-lime, aluminosilicate, neutral glass, lead glass as non-limiting examples. In some examples the tube 610 may be a ceramic and examples of types of ceramic may include alumina, silica, zirconia, stabilized zirconia, zircon, mullite, cordierite, magnesia, silicon carbide, porcelain. In FIG. 6C an example of a metal wire electrical contact, which may be an anode contact 621 is illustrated. In some examples, the metal wire may be a zinc wire. In other examples, it may be a wire of another metal such as brass which may be coated with zinc 620. The wire may be surrounded and sealed to a sealing material 622.

In following sections, numerous types of sealing are discussed, many examples of which are consistent with the sealing material 622 illustrated. In FIG. 6D another metal wire 630 may be used to form a cathode contact. In some examples the metal wire may be a titanium wire. The wire may have a deposit of cathode material 631 surrounding it. Another sealing material 632 may surround the cathode wire 630. Referring to FIG. 6E the tube 610 may have a wick 641 that may be a polyolefin film or a cellulosic film. In some examples, it may be a cellulosic thread spanning the region of the anode to the region of the cathode. The wick 641 may be positioned into a volume of electrolyte 640 placed into the tube. In some examples the electrolyte may be an aqueous solution such as a solution of $ZnCl_2$. In some other examples, the electrolyte may be a polymer electrolyte. Some aspects of the different electrolyte options are discussed in later sections herein. Proceeding to FIG. 6F, the various components illustrated in FIGS. 6E, 6D and 6C may be assembled to form a tubular form battery. The seals between the sealing material 622 and the tube 610 and the sealing material 632 and the tube 610 may comprise numerous types of seals as discussed in sections following. In some examples the wick 641 may be a full separator which may keep more densely packed battery chemicals separated as opposed to physical separation as illustrated in FIGS. 6A-6F.

In some examples, metal endcaps may be added as a design variation. The two wire leads may be embedded in a tubular shaped insulating adhesive body at either end. The tubular shaped adhesive may be contained partly within the tubular insulating container of the battery and may also project partially beyond the battery container. In some examples, adhesives may adhere and seal the wire leads and the insulating container. The insulating adhesive may contain the battery fluids and prevent leakage of fluids to the exterior. The adhesive may be a thermoset, thermoplastic or combination of the two.

Figure 7:
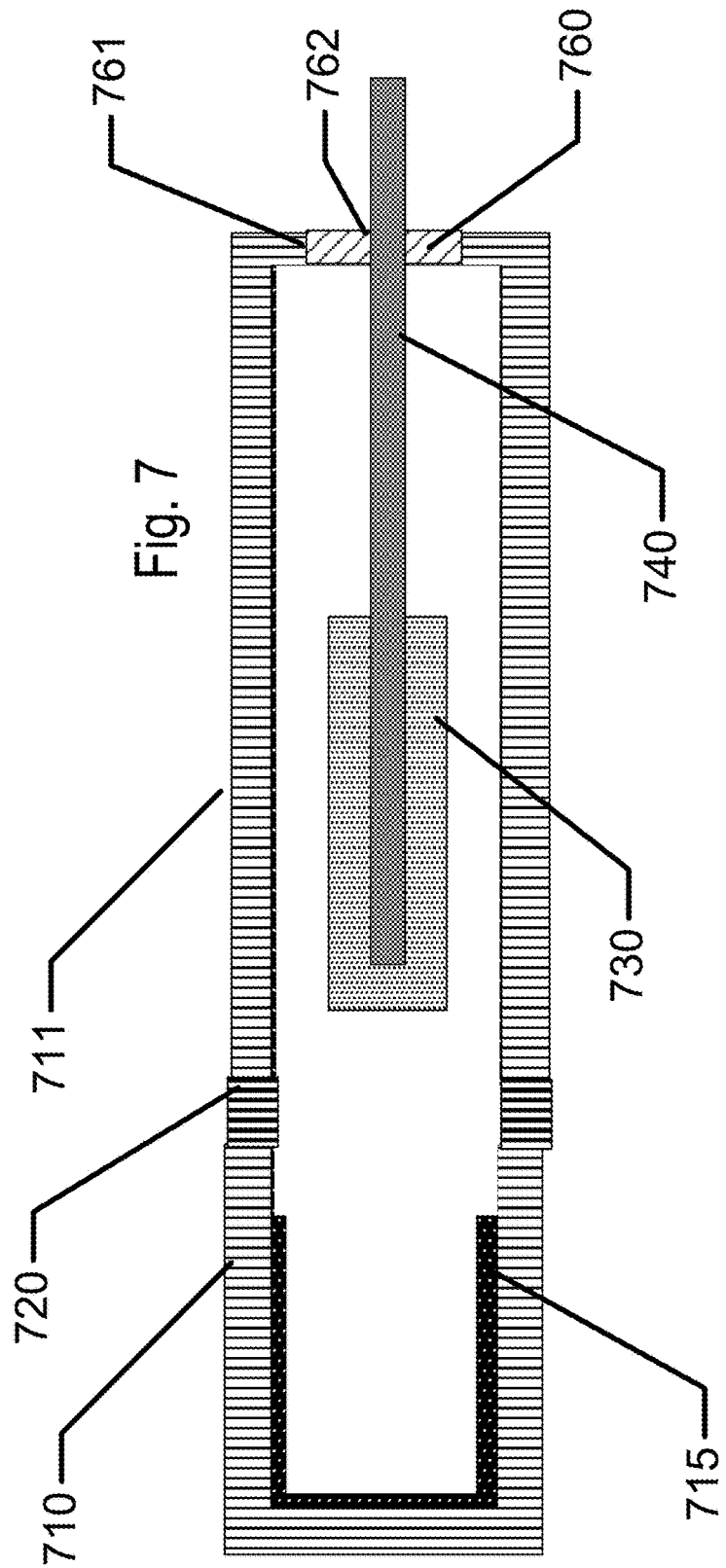
FIG. 7 illustrates an exemplary sealed tubular metal containment and sealed insulated wire end cap in a tubular battery design.

Referring to FIG. 7, an example of a tube form battery including a wire form cathode contact is illustrated. The example may comprise two tubes, one hollow tube 711 and one can shaped tube 710 which together may form the anode contact. Anode chemicals 715 may be deposited or otherwise filled into the can shaped tube 710. In some examples the anode chemicals 715 may include plated zinc. The can shaped tube 710 may be sealed to the hollow tube 711 with a metal to metal seal 720. In the example, there may be a metal wire 740 which may be coated with cathode chemicals 730. In some examples, the cathode chemicals 730 may include plated manganese dioxide. The metal wire 740 may form a cathode contact. The metal wire 740 may be formed of titanium in some examples. A ceramic insulator piece 760 may form the electrical insulation between the cathode formed of metal wire 740 and the anode contact made of the combination of hollow tube 711 and can shaped tube 710. A ceramic to metal seal 761 may be formed between the hollow tube 711 and the ceramic insulator piece 760. As well, a seal 762 may be formed between the ceramic insulator piece 760 and the metal wire 740.

Figure 8:
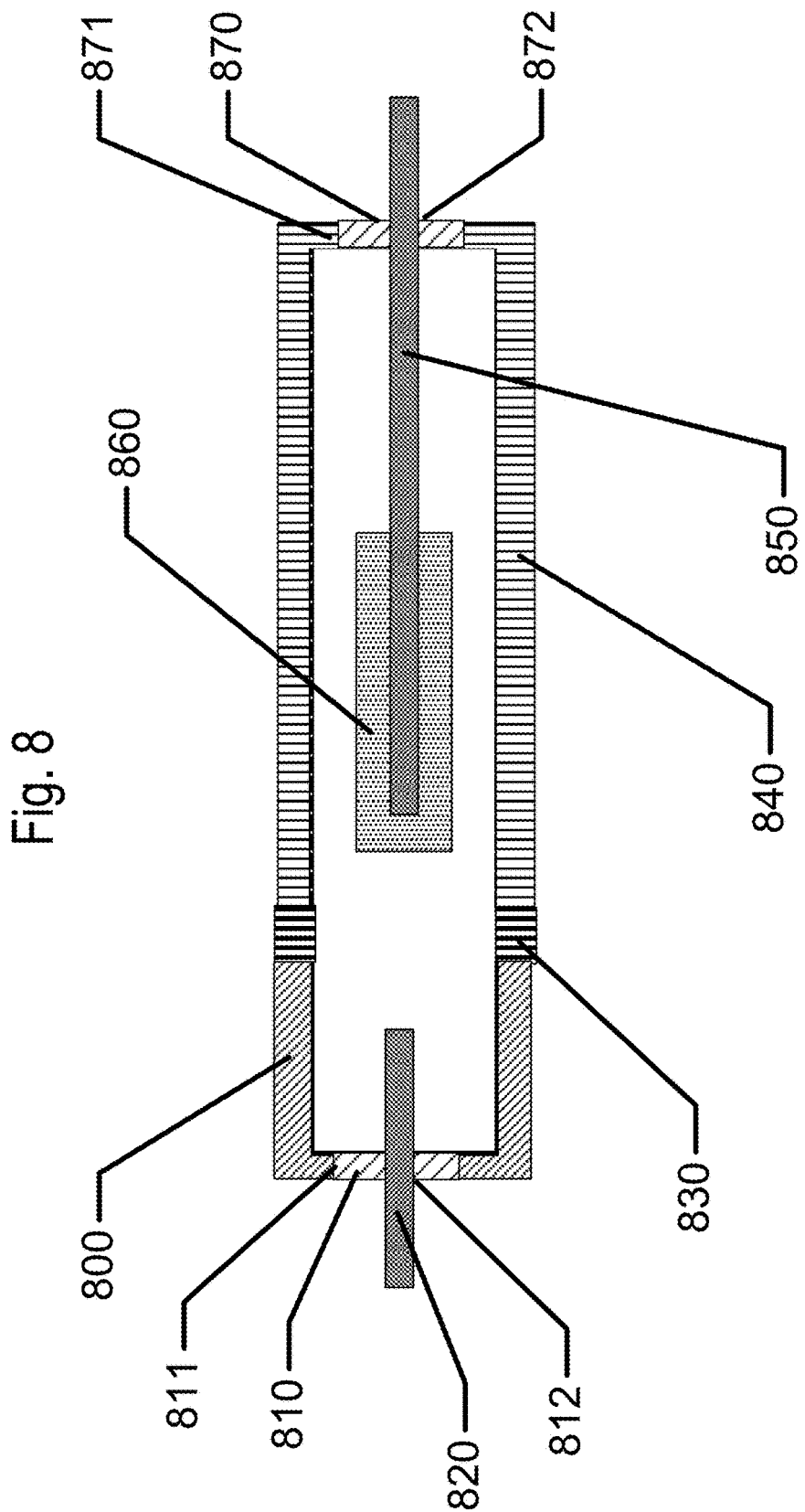
FIG. 8 illustrates an exemplary sealed tubular metal containment and sealed insulated wire end caps in a tubular battery design.

Referring to FIG. 8, still another example of a tube form battery including a wire form cathode contact and a wire form anode contact is illustrated. The example may comprise two tubes, a first hollow tube 800 and a second hollow tube 840 which together may contain the anode and cathode chemicals and electrolyte formulations. In the illustrated example, a wire of zinc 820 may form both the anode contact as well as the anode chemicals. In some examples the wire of zinc 820 may also be thickened in parts include plated zinc. The first hollow tube 800 may be sealed to the second hollow tube 840 with a metal to metal seal 830. In the example, there may be a metal wire 850 which may be coated with cathode chemicals as illustrated with the deposit 860. In some examples, the cathode chemicals may include plated manganese dioxide. The metal wire may form a cathode contact. The metal wire may be formed of titanium in some examples. A ceramic insulator piece 870 may form the electrical insulation between the cathode formed of metal wire 850 and the second hollow tube 840. On the other side of the exemplary battery may be the anode contact wire formed of a wire of zinc 820 which may be insulated by a second ceramic insulator piece 810. A ceramic to metal seal 871 may be formed between the hollow tube 840 and the ceramic insulator piece 870. As well, a seal 872 may be formed between the ceramic insulator piece 870 and the metal wire 850. A ceramic to metal seal 811 may also be formed between the hollow tube 800 and the ceramic insulator piece 810. As well a seal 812 may be formed between the ceramic insulator piece 810 and the metal wire 800.

Figure 9:
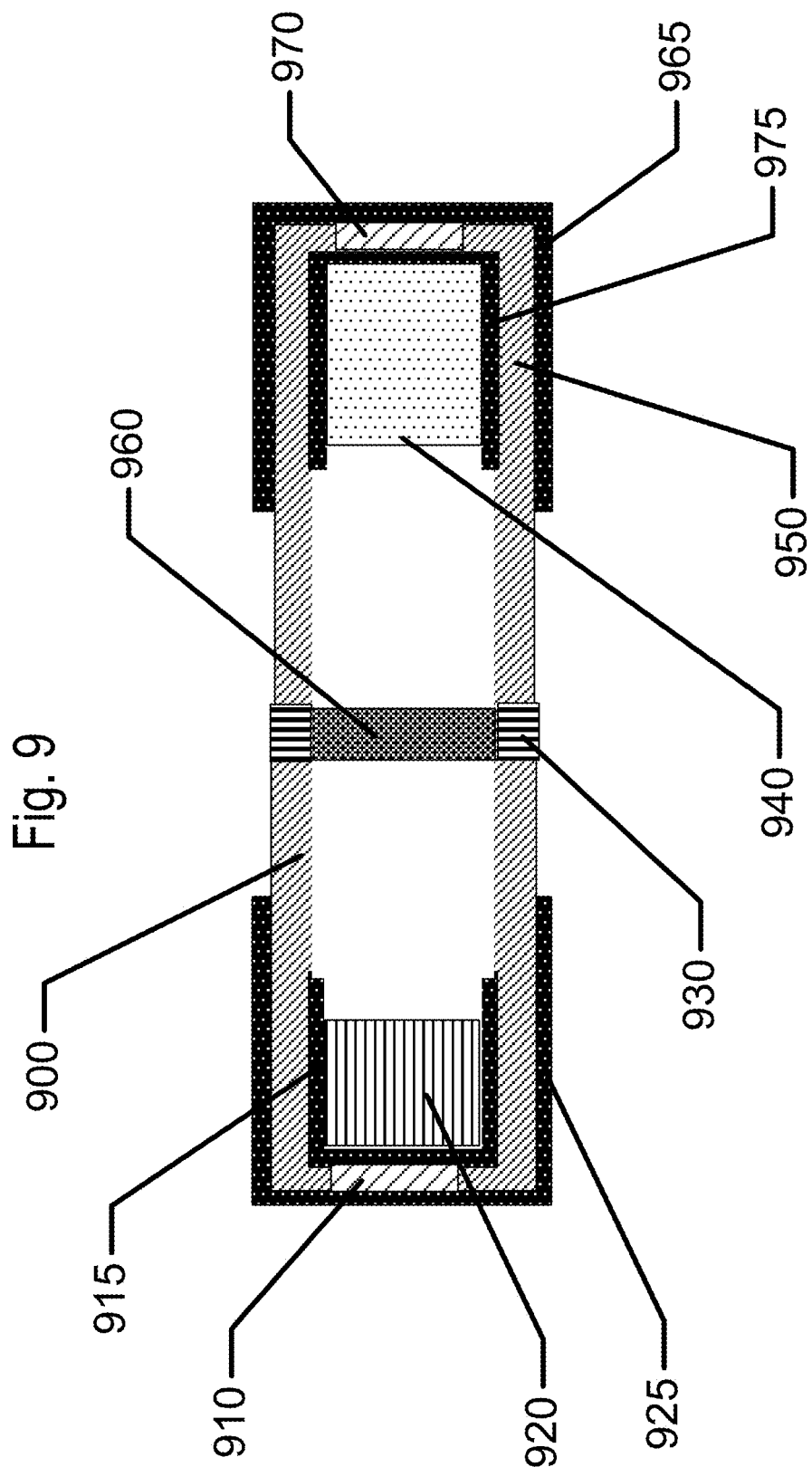
FIG. 9 illustrates an exemplary tubular insulator form with doped semiconductor containment pieces welded together in a tubular battery design.

Referring to FIG. 9, still another example of a tube form battery including doped semiconductor is illustrated. The use of doped semiconductors may dramatically lower the amount of sealing edge that is required in the battery since electrical contact is made through the tube by the highly-doped region. The non-doped regions may form insulators between the anode and cathode regions. For manufacturability, the battery may be formed of two can shaped pieces of semiconductor, highly doped at the ends which may be joined with a semiconductor to semiconductor seam 930. A highly-doped semiconductor when coated with a metal film such as titanium or when reacted to form a silicide such as titanium silicide can form an ohmic contact of small resistance. Since the semiconductor may be relatively thin, the result may be a low resistance contact that has no seams. If the semiconductor to semiconductor seam 930 is located in a region of a separator, there may be very little overlap of internal chemistry with a seam. Returning to FIG. 9, the example device may comprise two tubes, a first hollow semiconductor can 900 and a second hollow semiconductor can 950 which together may contain the anode and cathode chemicals and electrolyte formulations. In the illustrated example a metal film 915 may form an internal anode contact. The first hollow semiconductor can 900 may have a highly doped region 910. In some examples, the highly-doped region may be doped with an N-type dopant such as phosphorous. An outside metal layer 925 may form the external anode contact. The anode chemicals 920 may be located in the can. The anode may be deposited films, slurry or solid plugs in examples. The first hollow semiconductor can 900 may be sealed to the second hollow semiconductor can 950 with a semiconductor to semiconductor seal 930, and in some examples a collocated separator 960. In the example, there may be a metal film 975 which may be coated with cathode chemicals as illustrated with the deposit 940.

In some examples, the cathode chemicals may include plated manganese dioxide. A highly-doped region 970 may form the electrical contact through the second hollow semiconductor can 950 and it may have an external metal deposit to form the cathode contact 965.

Battery Element Internal Seals

In some examples of battery elements for use in biomedical devices, the chemical action of the battery involves aqueous chemistry, where water or moisture is an important constituent to control. Therefore, it may be important to incorporate sealing mechanisms that retard or prevent the movement of moisture either out of or into the battery body. Moisture barriers may be designed to keep the internal moisture level at a designed level, within some tolerance. In some examples, a moisture barrier may be divided into two sections or components; namely, the package and the seal.

The package may refer to the main material of the enclosure. In some examples, the package may comprise a bulk material. The Water Vapor Transmission Rate (WVTR) may be an indicator of performance, with ISO, ASTM standards controlling the test procedure, including the environmental conditions operant during the testing. Ideally, the WVTR for a good battery package may be "zero." Exemplary materials with a near-zero WVTR may be glass and metal foils as well as ceramics and metallic pieces. Plastics, on the other hand, may be inherently porous to moisture, and may vary significantly for different types of plastic. Engineered materials, laminates, or co-extrudes may usually be hybrids of the common package materials.

The seal may be the interface between two of the package surfaces. The connecting of seal surfaces finishes the enclosure along with the package. In many examples, the nature of seal designs may make them difficult to characterize for the seal's WVTR due to difficulty in performing measurements using an ISO or ASTM standard, as the sample size or surface area may not be compatible with those procedures. In some examples, a practical manner to testing seal integrity may be a functional test of the actual seal design, for some defined conditions. Seal performance may be a function of the seal material, the seal thickness, the seal length, the seal width, and the seal adhesion or intimacy to package substrates.

In some examples, seals may be formed by a welding process that may involve thermal, laser, solvent, friction, ultrasonic, or arc processing. In other examples, seals may be formed through the use of adhesive sealants such as glues, epoxies, acrylics, natural rubber, synthetic rubber, resins, tars or bitumen. Other examples may derive from the utilization of gasket type material that may be formed from natural and synthetic rubber, polytetrafluoroethylene (PTFE), polypropylene, and silicones to mention a few non-limiting examples. In some examples, the sealing material may be a thermoset, thermoplastic or a combination of a thermoset and a thermoplastic.

In some examples, the batteries according to the present invention may be designed to have a specified operating life. The operating life may be estimated by determining a practical amount of moisture permeability that may be obtained using a particular battery system and then estimating when such a moisture leakage may result in an end of life condition for the battery. For example, if a battery is stored in a wet environment, then the partial pressure difference between inside and outside the battery will be minimal, resulting in a reduced moisture loss rate, and therefore the battery life may be extended. The same exemplary battery stored in a particularly dry and hot environment may have a significantly reduced expectable lifetime due to the strong driving function for moisture loss.

Metal/Metal, Metal/Glass, Metal/Ceramic, Glass/Glass, Semiconductor/Semiconductor and Metal/Semiconductor Seals There may be numerous means to form a hermetic or well-sealed interface between solid materials that may act as containment for battery chemistry. Typical means for forming a proper hermetic mechanical bond between solid materials includes soldering, brazing, and welding. These methods may be seen as largely similar, as they all include thermally treating both base materials (the materials to be bonded, which can be either homogeneous or heterogeneous materials) and a filler material that bonds between the two base materials. The main distinctions that exist between these methods may be seen as the specific temperatures that are used to heat the materials for each method and how these temperatures affect the properties of each material when applied over a length of time. More specifically, both brazing and soldering may utilize a temperature that is above the liquidus temperature of the filler material, but below the solidus temperature of both base materials. The main distinction that may exist between brazing and soldering may be seen as the specific temperature that is applied. For example, if the applied temperature is below 450° C., the method may be referred to as soldering, and may be referred to as brazing if the applied temperature is above 450° C. Welding, however, may utilize an applied temperature that is above the liquidus of the filler material and base materials alike.

Each of the aforementioned methods can work for a variety of material combinations, and specific material combinations may be able to be bonded together by more than one of these methods. The optimal choice among those methods, for bonding two materials together, may be determined by any number of characteristics including but not limited to, the specific material properties and liquidus temperatures of the desired materials, other thermal properties of the desired bonding or filler materials, the skill, timing, and precision of the worker or machine bonding the two materials, and an acceptable level of mechanical or surface damage to the bonded materials by each method. In some examples, consistent with the present invention, the materials used for bonding two materials together may include pure metals such as gold, silver, indium and platinum. It may also include alloys such as silver-copper, silver-zinc, copper-zinc, copper-zinc-silver, copper-phosphorus, silver-copper-phosphorus, gold-silver, gold-nickel, gold-copper, indium alloys and aluminum-silicon. It may also include active braze alloys such as titanium active braze alloys which may include gold, copper, nickel, silver, vanadium or aluminum. There may be other brazing materials which may be consistent with the sealing needs mentioned in the present disclosure.

Different material combinations for each of these bonding methods may include metal/metal, metal/glass, metal/ceramic, glass/glass, semiconductor/semiconductor, and metal/semiconductor.

In a first type of example, a metal seal to metal seal may be formed. Soldering, brazing, and welding, are all very commonly used for metal/metal bonding. Since the material properties of various metals may vary quite widely from metal to metal, the liquidus temperature of a metal may typically be the deciding characteristic for which bonding method to use with a desired metal, for example, a base metal may have such a low liquidus temperature that it will melt quickly at brazing temperatures, or a base metal may have such a high liquidus temperature that is does not chemically respond to soldering temperatures to form a proper bond.

In another type of example, a metal to glass (or glass to metal) seal may be formed. Due to the inhomogeneity of metal and glass as materials, typical metal/metal bonding methods may not be conducive to the bonding of metals with glass. For example, typical filler materials used in metal/metal soldering may bond well to a metal, but may not react with glass to bond to its surface under thermal treatment. One possibility to overcome this issue may be to use other materials, such as epoxies, that bond to both materials. Typical epoxies have pendant hydroxyl groups in their structure that may allow them to bond strongly to inorganic materials. Epoxy may be easily and cheaply applied between materials, bonding ubiquitously to many types of surfaces. Epoxies may be easily cured as well before or after application through many methods, such as mixing of chemicals that are then quickly applied, thermal, light based, or other types of radiation that introduce energy into the epoxy to induce a bonding/curing reaction, or through other methods. Many different types of epoxies may have differing desirability for different applications, based on many different properties including, but not limited to, bond strength, ease of applicability, curing method, curing time, bondable materials, and many others. For achieving true hermetic sealing with epoxy, it is vital to consider the leak rates of certain fluids through the epoxy. Hermetic sealing with epoxy, however, offers the flexibility of using copper alloys for wires or pins while still maintaining a hermetic seal, as opposed to less conductive materials that are required for other types of bonding or hermetic sealing. Epoxy seals, however, are typically viable under much more constrained operation temperature ranges than other bonding methods, and may also have a significantly lower bond strength.

In another type of example, a metal to ceramic (or ceramic to metal) seal may be formed. Brazing may be seen as a typical method for achieving metal to ceramic bonding, and there are a multitude of proven and accepted methods for achieving a hermetic seal between the materials. This may include the molybdenum-manganese/nickel plating method, where molybdenum and manganese particles are mixed with glass additives and volatile carriers to form a coating that is applied to the ceramic surface that will be brazed. This coating is processed and then plated with nickel and processed further, to be now readily brazed using standard methods and filler materials.

Thin film deposition may also be seen as another commonly used brazing method. In this method, a combination of materials may be applied to a nonmetallic surface using a physical vapor deposition (PVD) method. The choice of materials applied may depend on desired material properties or layer thicknesses, and occasionally multiple layers are applied. This method has many advantages including a wide diversity of possible metals for application, as well as speed and proven consistent success with standard materials. There are disadvantages, however, including the need for specialized PVD equipment to apply coatings, the need for complicated masking techniques if masking is desired, and geometric constraints with the ceramic that may prevent uniform coating thicknesses. The PVD layer may include constituents such as titanium, zirconium and hafnium, and in some examples, may be between 100 nanometers to 250 nanometers thick. In some examples a noble over-layer may be deposited comprising constituents such as Gold, Palladium, Platinum or Silver as non-limiting examples.

Nanofoil® Material Bonding

A commercially available product called Nanofoil®, a nanotechnology material available from Indium Corporation, may provide a significant example when sealing metal, ceramic and/or semiconductor containment for batteries may be required. In some examples, it may be desirable that any thermal effects in the formation of the seal are as localized to the seal itself as possible. Material composites such as Nanofoil® material may provide significant thermal localization while forming hermetic bonded seals. The Nanofoil® type composite films may be made of hundreds or thousands of nanoscale film levels. In an example, a reactive multi-layer foil is fabricated by vapor-depositing thousands of alternating layers of Aluminum (Al) and Nickel (Ni). These layers may be nanometers in thickness. When activated by a small pulse of local energy from electrical, optical or thermal sources, the foil reacts exothermically. The resulting exothermic reaction delivers a quantifiable amount of energy in thousandths of seconds that heats to very high local temperatures at surfaces but may be engineered not to deliver a total amount of energy that would increase temperature in the metal, ceramic or semiconductor pieces that are being sealed. Proceeding to FIG. 10A a portion of the seal 830 from the battery illustrated in FIG. 8 is highlighted. In FIG. 10B an example of layers related to the seal before an activation of a nanofoil is made. A first hollow tube 800 and a second hollow tube 840 may be coated with a prewet solder layer on each side for a first solder layer 1010 and a second solder layer 1030. In between the two solder layers a piece of Nanofoil® material 1020 may be located. When the Nanofoil® material is activated it may locally melt the solder layers and form a seal 830. The illustration depicts a butt type joint, but many other joint structures may be possible including overlapping designs, fluted designs and other types of joints where a piece of Nanofoil may be located between two surfaces to be sealed that have solder coated surfaces.

S-Bond® Sealing

A similar example to Nanofoil® material bonding may be S-Bond® material bonding. S-Bond material may comprise a conventional solder alloy base with the addition of titanium or other rare earth elements to the material and is available from S-Bond Technologies. The active materials like titanium react with oxides or other inert materials at a bonding interface and either chemically bond to them or transport them into the solder melt. Upon heating, the S-Bond® materials may melt but still have a thin surface oxide thereupon. When that surface oxide is disrupted the active material reactions occur with the surface regions of the bond/seal. The oxide may be disrupted with scraping processes, but may also be disrupted with ultrasonics. Therefore, a surface reaction may be initiated at relatively low temperature and a bond may be made to materials that might be difficult to bond otherwise. In some examples, the S-Bond® material may be combined with the Nanofoil® material to form a structure that may be locally bonded without significant thermal load to the rest of the battery system.

Silicon Bonding

Silicon bonding may be achieved with S-Bond® material in some examples. The composition of S-Bond® 220M may be used in some examples to form a solderable interface. The S-Bond® 220M material may be deposited upon the silicon surface to be bonded/sealed at temperatures ranging from 115-400° C. Therefore, can shaped pieces of silicon may be heavily doped on the closed end, either through the use of doped films such as POCl, through implantation, or through other means of doping. Another means may include oxidizing the body of the semiconductor and then chemically etching the oxide in regions where the dopant is desired. The doped regions may then be exposed to titanium and heated to form a silicide. The regions of the silicon cans that are used to form seals may have S-Bond 220M material applied to them and heated to wet onto the silicon surface, or silicide surface. In some examples a film of Nanofoil® material may be applied in the seal region for subsequent activation. The battery chemistry, electrolyte and other structures may be formed into the can halves and then the two halves may be placed together. Under the simultaneous activation by ultrasonics and by activation of the Nanofoil® material a rapid, low temperature hermitic seal may be formed.

Battery Module Thickness

In designing battery components for biomedical applications, tradeoffs amongst the various parameters may be made balancing technical, safety and functional requirements. The thickness of the battery component may be an important and limiting parameter. For example, in an optical lens application the ability of a device to be comfortably worn by a user may have a critical dependence on the thickness across the biomedical device. Therefore, there may be critical enabling aspects in designing the battery for thinner results. In some examples, battery thickness may be determined by the combined thicknesses of top and bottom sheets, spacer sheets, and adhesive layer thicknesses. Practical manufacturing aspects may drive certain parameters of film thickness to standard values in available sheet stock. In addition, the films may have minimum thickness values to which they may be specified base upon technical considerations relating to chemical compatibility, moisture/gas impermeability, surface finish, and compatibility with coatings that may be deposited upon the film layers.

In some examples, a desired or goal thickness of a finished battery component may be a component thickness that is less than 220 μm. In these examples, this desired thickness may be driven by the three-dimensional geometry of an exemplary ophthalmic lens device where the battery component may need to be fit inside the available volume defined by a hydrogel lens shape given end user comfort, biocompatibility, and acceptance constraints. This volume and its effect on the needs of battery component thickness may be a function of total device thickness specification as well as device specification relating to its width, cone angle, and inner diameter. Another important design consideration for the resulting battery component design may relate to the volume available for active battery chemicals and materials in a given battery component design with respect to the resulting chemical energy that may result from that design. This resulting chemical energy may then be balanced for the electrical requirements of a functional biomedical device for its targeted life and operating conditions.

Battery Module Width

There may be numerous applications into which the biocompatible energization elements or batteries of the present invention may be utilized. In general, the battery width requirement may be largely a function of the application in which it is applied. In an exemplary case, a contact lens battery system may have constrained needs for the specification on the width of a modular battery component. In some examples of an ophthalmic device where the device has a variable optic function powered by a battery component, the variable optic portion of the device may occupy a central spherical region of about 7.0 mm in diameter. The exemplary battery elements may be considered as a three-dimensional object, which fits as an annular, conical skirt around the central optic and formed into a truncated conical ring. If the required maximum diameter of the rigid insert is a diameter of 8.50 mm, and tangency to a certain diameter sphere may be targeted (as for example in a roughly 8.40 mm diameter), then geometry may dictate what the allowable battery width may be. There may be geometric models that may be useful for calculating desirable specifications for the resulting geometry which in some examples may be termed a conical frustum flattened into a sector of an annulus.

Flattened battery width may be driven by two features of the battery element, the active battery components and seal width. In some examples relating to ophthalmic devices a target thickness may be between 0.100 mm and 0.500 mm per side, and the active battery components may be targeted at approximately 0.800 mm wide. Other biomedical devices may have differing design constraints but the principles for flexible flat battery elements may apply in similar fashion.

Battery Module Flexibility

Another dimension of relevance to battery design and to the design of related devices that utilize battery based energy sources is the flexibility of the battery component. There may be numerous advantages conferred by flexible battery forms. For example, a flexible battery module may facilitate the previously mentioned ability to fabricate the battery form in a two-dimensional (2D) flat form. The flexibility of the form may allow the two-dimensional battery to then be formed into an appropriate 3D shape to fit into a biomedical device such as a contact lens.

In another example of the benefits that may be conferred by flexibility in the battery module, if the battery and the subsequent device is flexible then there may be advantages relating to the use of the device. In an example, a contact lens form of a biomedical device may have advantages for insertion/removal of the media insert based contact lens that may be closer to the insertion/removal of a standard, non-filled hydrogel contact lens.

The number of flexures may be important to the engineering of the battery. For example, a battery which may only flex one time from a planar form into a shape suitable for a contact lens may have significantly different design from a battery capable of multiple flexures. The flexure of the battery may also extend beyond the ability to mechanically survive the flexure event. For example, an electrode may be physically capable of flexing without breaking, but the mechanical and electrochemical properties of the electrode may be altered by flexure. Flex-induced changes may appear instantly, for example, as changes to impedance, or flexure may introduce changes which are only apparent in long-term shelf life testing.

Battery Shape Aspects

Battery shape requirements may be driven at least in part by the application for which the battery is to be used. Traditional battery form factors may be cylindrical forms or rectangular prisms, made of metal, and may be geared toward products which require large amounts of power for long durations. These applications may be large enough that they may comprise large form factor batteries. In another example, planar (2D) solid-state batteries are thin rectangular prisms, typically formed upon inflexible silicon or glass. These planar solid-state batteries may be formed in some examples using silicon wafer-processing technologies. In another type of battery form factor, low power, flexible batteries may be formed in a pouch construct, using thin foils or plastic to contain the battery chemistry. These batteries may be made flat (2D), and may be designed to function when bowed to a modest out-of-plane (3D) curvature.

In some of the examples of the battery applications in the present invention where the battery may be employed in a variable optic lens, the form factor may require a three-dimensional curvature of the battery component where a radius of that curvature may be on the order of approximately 8.4 mm. The nature of such a curvature may be considered to be relatively steep and for reference may approximate the type of curvature found on a human fingertip. The nature of a relative steep curvature creates challenging aspects for manufacture. In some examples of the present invention, a modular battery component may be designed such that it may be fabricated in a flat, two-dimensional manner and then formed into a three-dimensional form of relative high curvature.

Battery Element Separators

Batteries of the type described in the present invention may utilize a separator material that physically and electrically separates the anode and anode current collector portions from the cathode and cathode current collector portions. The separator may be a membrane that is permeable to water and dissolved electrolyte components; however, it may typically be electrically non-conductive. While a myriad of commercially-available separator materials may be known to those of skill in the art, the novel form factor of the present invention may present unique constraints on the task of separator selection, processing, and handling.

Since the designs of the present invention may have ultra-thin profiles, the choice may be limited to the thinnest separator materials typically available. For example, separators of approximately 25 microns in thickness may be desirable. Some examples which may be advantageous may be about 12 microns in thickness. There may be numerous acceptable commercial separators include micro fibrillated, microporous polyethylene monolayer and/or polypropylene-polyethylene-polypropylene (PP/PE/PP) trilayer separator membranes such as those produced by Celgard (Charlotte, N.C.). A desirable example of separator material may be Celgard M824 PP/PE/PP trilayer membrane having a thickness of 12 microns. Alternative examples of separator materials useful for examples of the present invention may include separator membranes including regenerated cellulose (e.g. cellophane).

While PP/PE/PP trilayer separator membranes may have advantageous thickness and mechanical properties, owing to their polyolefinic character, they may also suffer from a number of disadvantages that may need to be overcome in order to make them useful in examples of the present invention. Roll or sheet stock of PP/PE/PP trilayer separator materials may have numerous wrinkles or other form errors that may be deleterious to the micron-level tolerances applicable to the batteries described herein. Furthermore, polyolefin separators may need to be cut to ultra-precise tolerances for inclusion in the present designs, which may therefore implicate laser cutting as an exemplary method of forming discrete current collectors in desirable shapes with tight tolerances. Owing to the polyolefinic character of these separators, certain cutting lasers useful for micro fabrication may employ laser wavelengths, e.g. 355 nm, that will not cut polyolefins. The polyolefins do not appreciably absorb the laser energy and are thereby non-ablatable. Finally, polyolefin separators may not be inherently wettable to aqueous electrolytes used in the batteries described herein.

Nevertheless, there may be methods for overcoming these inherent limitations for polyolefinic type membranes. In order to present a microporous separator membrane to a high-precision cutting laser for cutting pieces into arc segments or other advantageous separator designs, the membrane may need to be flat and wrinkle-free. If these two conditions are not met, the separator membrane may not be fully cut because the cutting beam may be inhibited as a result of defocusing of or otherwise scattering the incident laser energy. Additionally, if the separator membrane is not flat and wrinkle-free, the form accuracy and geometric tolerances of the separator membrane may not be sufficiently achieved. Allowable tolerances for separators of current examples may be, for example, +0 microns and −20 microns with respect to characteristic lengths and/or radii. There may be advantages for tighter tolerances of +0 microns and −10 micron and further for tolerances of +0 microns and −5 microns. Separator stock material may be made flat and wrinkle-free by temporarily laminating the material to a float glass carrier with an appropriate low-volatility liquid. Low-volatility liquids may have advantages over temporary adhesives due to the fragility of the separator membrane and due to the amount of processing time that may be required to release separator membrane from an adhesive layer. Furthermore, in some examples achieving a flat and wrinkle-free separator membrane on float glass using a liquid has been observed to be much more facile than using an adhesive. Prior to lamination, the separator membrane may be made free of particulates. This may be achieved by ultrasonic cleaning of separator membrane to dislodge any surface-adherent particulates. In some examples, handling of a separator membrane may be done in a suitable, low-particle environment such as a laminar flow hood or a cleanroom of at least class 10,000. Furthermore, the float glass substrate may be made to be particulate free by rinsing with an appropriate solvent, ultrasonic cleaning, and/or wiping with clean room wipes.

While a wide variety of low-volatility liquids may be used for the mechanical purpose of laminating microporous polyolefin separator membranes to a float glass carrier, specific requirements may be imposed on the liquid to facilitate subsequent laser cutting of discrete separator shapes. One requirement may be that the liquid has a surface tension low enough to soak into the pores of the separator material which may easily be verified by visual inspection. In some examples, the separator material turns from a white color to a translucent appearance when liquid fills the micropores of the material. It may be desirable to choose a liquid that may be benign and "safe" for workers that will be exposed to the preparation and cutting operations of the separator. It may be desirable to choose a liquid whose vapor pressure may be low enough so that appreciable evaporation does not occur during the time scale of processing (on the order of 1 day). Finally, in some examples the liquid may have sufficient solvating power to dissolve advantageous UV absorbers that may facilitate the laser cutting operation. In an example, it has been observed that a 12 percent (w/w) solution of avobenzone UV absorber in benzyl benzoate solvent may meet the aforementioned requirements and may lend itself to facilitating the laser cutting of polyolefin separators with high precision and tolerance in short order without an excessive number of passes of the cutting laser beam. In some examples, separators may be cut with an 8 W 355 nm nanosecond diode-pumped solid state laser using this approach where the laser may have settings for low power attenuation (e.g. 3 percent power), a moderate speed of 1 to 10 mm/s, and only 1 to 3 passes of the laser beam. While this UV-absorbing oily composition has been proven to be an effective laminating and cutting process aid, other oily formulations may be envisaged by those of skill in the art and used without limitation.

In some examples, a separator may be cut while fixed to a float glass. One advantage of laser cutting separators while fixed to a float glass carrier may be that a very high number density of separators may be cut from one separator stock sheet much like semiconductor die may be densely arrayed on a silicon wafer. Such an approach may provide economy of scale and parallel processing advantages inherent in semiconductor processes. Furthermore, the generation of scrap separator membrane may be minimized. Once separators have been cut, the oily process aid fluid may be removed by a series of extraction steps with miscible solvents, the last extraction may be performed with a high-volatility solvent such as isopropyl alcohol in some examples. Discrete separators, once extracted, may be stored indefinitely in any suitable low-particle environment.

As previously mentioned polyolefin separator membranes may be inherently hydrophobic and may need to be made wettable to aqueous surfactants used in the batteries of the present invention. One approach to make the separator membranes wettable may be oxygen plasma treatment. For example, separators may be treated for 1 to 5 minutes in a 100 percent oxygen plasma at a wide variety of power settings and oxygen flow rates. While this approach may improve wettability for a time, it may be well-known that plasma surface modifications provide a transient effect that may not last long enough for robust wetting of electrolyte solutions. Another approach to improve wettability of separator membranes may be to treat the surface by incorporating a suitable surfactant on the membrane. In some cases, the surfactant may be used in conjunction with a hydrophilic polymeric coating that remains within the pores of the separator membrane.

Another approach to provide more permanence to the hydrophilicity imparted by an oxidative plasma treatment may be by subsequent treatment with a suitable hydrophilic organosilane. In this manner, the oxygen plasma may be used to activate and impart functional groups across the entire surface area of the microporous separator. The organosilane may then covalently bond to and/or non-covalently adhere to the plasma treated surface. In examples using an organosilane, the inherent porosity of the microporous separator may not be appreciably changed, monolayer surface coverage may also be possible and desired. Prior art methods incorporating surfactants in conjunction with polymeric coatings may require stringent controls over the actual amount of coating applied to the membrane, and may then be subject to process variability. In extreme cases, pores of the separator may become blocked, thereby adversely affecting utility of the separator during the operation of the electrochemical cell. An exemplary organosilane useful in the present invention may be (3-aminopropyl)triethoxysilane. Other hydrophilic organosilanes may be known to those of skill in the art and may be used without limitation.

Still another method for making separator membranes wettable by aqueous electrolyte may be the incorporation of a suitable surfactant in the electrolyte formulation. One consideration in the choice of surfactant for making separator membranes wettable may be the effect that the surfactant may have on the activity of one or more electrodes within the electrochemical cell, for example, by increasing the electrical impedance of the cell. In some cases, surfactants may have advantageous anti-corrosion properties, specifically in the case of zinc anodes in aqueous electrolytes. Zinc may be an example of a material known to undergo a slow reaction with water to liberate hydrogen gas, which may be undesirable. Numerous surfactants may be known by those of skill in the art to limit rates of said reaction to advantageous levels. In other cases, the surfactant may so strongly interact with the zinc electrode surface that battery performance may be impeded. Consequently, much care may need to be made in the selection of appropriate surfactant types and loading levels to ensure that separator wettability may be obtained without deleteriously affecting electrochemical performance of the cell. In some cases, a plurality of surfactants may be used, one being present to impart wettability to the separator membrane and the other being present to facilitate anti-corrosion properties to the zinc anode. In one example, no hydrophilic treatment is done to the separator membrane and a surfactant or plurality of surfactants is added to the electrolyte formulation in an amount sufficient to effect wettability of the separator membrane.

Discrete separators may be integrated into a tubular microbattery by direct placement into a portion of one or sides of a tube assembly.

Polymerized Battery Element Separators

In some battery designs, the use of a discrete separator (as described in a previous section) may be precluded due to a variety of reasons such as the cost, the availability of materials, the quality of materials, or the complexity of processing for some material options as non-limiting examples.

A method to achieve a uniform, mechanically robust form-in-place separator may be to use UV-curable hydrogel formulations. Numerous water-permeable hydrogel formulations may be known in various industries, for example, the contact lens industry. An example of a common hydrogel in the contact lens industry may be poly(hydroxyethylmethacrylate) crosslinked gel, or simply pHEMA. For numerous applications of the present invention, pHEMA may possess many attractive properties for use in Leclanché and zinc-carbon batteries. pHEMA typically may maintain a water content of approximately 30-40 percent in the hydrated state while maintaining an elastic modulus of about 100 psi or greater. Furthermore, the modulus and water content properties of crosslinked hydrogels may be adjusted by one of skill in the art by incorporating additional hydrophilic monomeric (e.g. methacrylic acid) or polymeric (e.g. polyvinylpyrrolidone) components. In this manner, the water content, or more specifically, the ionic permeability of the hydrogel may be adjusted by formulation.

Of particular advantage in some examples, a castable and polymerizable hydrogel formulation may contain one or more diluents to facilitate processing. The diluent may be chosen to be volatile such that the castable mixture may be squeegeed into a cavity, and then allowed a sufficient drying time to remove the volatile solvent component. After drying, a bulk photopolymerization may be initiated by exposure to actinic radiation of appropriate wavelength, such as blue UV light at 420 nm, for the chosen photoinitiator, such as CGI 819. The volatile diluent may help to provide a desirable application viscosity so as to facilitate casting a uniform layer of polymerizable material in the cavity. The volatile diluent may also provide beneficial surface tension lowering effects, particularly in the case where strongly polar monomers are incorporated in the formulation. Another aspect that may be important to achieve the casting of a uniform layer of polymerizable material in the cavity may be the application viscosity. Common small molar mass reactive monomers typically do not have very high viscosities, which may be typically only a few centipoise. In an effort to provide beneficial viscosity control of the castable and polymerizable separator material, a high molar mass polymeric component known to be compatible with the polymerizable material may be selected for incorporation into the formulation. Examples of high molar mass polymers which may be suitable for incorporation into exemplary formulations may include polyvinylpyrrolidone and polyethylene oxide.

In some examples the castable, polymerizable separator may be advantageously applied into a designed cavity, as previously described. In alternative examples, there may be no cavity at the time of polymerization. Instead, the castable, polymerizable separator formulation may be coated onto an electrode-containing substrate, for example, patterned zinc plated brass, and then subsequently exposed to actinic radiation using a photomask to selectively polymerize the separator material in targeted areas. Unreacted separator material may then be removed by exposure to appropriate rinsing solvents. In these examples, the separator material may be designated as a photo-patternable separator.

Multiple Component Separator Formulations

The separator, useful according to examples of the present invention, may have a number of properties that may be important to its function. In some examples, the separator may desirably be formed in such a manner as to create a physical barrier such that layers on either side of the separator do not physically contact one another. The layer may therefore have an important characteristic of uniform thickness, since while a thin layer may be desirable for numerous reasons, a void or gap free layer may be essential. Additionally, the thin layer may desirably have a high permeability to allow for the free flow of ions. Also, the separator requires optimal water uptake to optimize mechanical properties of the separator. Thus, the formulation may contain a crosslinking component, a hydrophilic polymer component, and a solvent component.

A crosslinker may be a monomer with two or more polymerizable double bonds. Suitable crosslinkers may be compounds with two or more polymerizable functional groups. Examples of suitable hydrophilic crosslinkers may also include compounds having two or more polymerizable functional groups, as well as hydrophilic functional groups such as polyether, amide or hydroxyl groups. Specific examples may include TEGDMA (tetraethyleneglycol dimethacrylate), TrEGDMA (triethyleneglycol dimethacrylate), ethyleneglycol dimethacylate (EGDMA), ethylenediamine dimethyacrylamide, glycerol dimethacrylate and combinations thereof.

The amounts of crosslinker that may be used in some examples may range, e.g., from about 0.000415 to about 0.0156 mole per 100 grams of reactive components in the reaction mixture. The amount of hydrophilic crosslinker used may generally be about 0 to about 2 weight percent and, for example, from about 0.5 to about 2 weight percent. Hydrophilic polymer components capable of increasing the viscosity of the reactive mixture and/or increasing the degree of hydrogen bonding with the slow-reacting hydrophilic monomer, such as high molecular weight hydrophilic polymers, may be desirable.

The high molecular weight hydrophilic polymers provide improved wettability, and in some examples, may improve wettability to the separator of the present invention. In some non-limiting examples, it may be believed that the high molecular weight hydrophilic polymers are hydrogen bond receivers which in aqueous environments, hydrogen bond to water, thus becoming effectively more hydrophilic. The absence of water may facilitate the incorporation of the hydrophilic polymer in the reaction mixture. Aside from the specifically named high molecular weight hydrophilic polymers, it may be expected that any high molecular weight polymer will be useful in the present invention provided that when said polymer is added to an exemplary silicone hydrogel formulation, the hydrophilic polymer (a) does not substantially phase separate from the reaction mixture and (b) imparts wettability to the resulting cured polymer.

In some examples, the high molecular weight hydrophilic polymer may be soluble in the diluent at processing temperatures. Manufacturing processes which use water or water soluble diluents, such as isopropyl alcohol (IPA), may be desirable examples due to their simplicity and reduced cost. In these examples, high molecular weight hydrophilic polymers which are water soluble at processing temperatures may also be desirable examples.

Examples of high molecular weight hydrophilic polymers may include but are not limited to polyamides, polylactones, polyimides, polylactams and functionalized polyamides, polylactones, polyimides, polylactams, such as PVP and copolymers thereof, or alternatively, DMA functionalized by copolymerizing DMA with a lesser molar amount of a hydroxyl-functional monomer such as HEMA, and then reacting the hydroxyl groups of the resulting copolymer with materials containing radical polymerizable groups. High molecular weight hydrophilic polymers may include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyacrylic acid, polyethylene oxide, poly 2 ethyl oxazoline, heparin polysaccharides, polysaccharides, mixtures and copolymers (including block or random, branched, multichain, comb-shaped or star-shaped) thereof where poly-N-vinylpyrrolidone (PVP) may be a desirable example where PVP has been added to a hydrogel composition to form an interpenetrating network which shows a low degree of surface friction and a low dehydration rate.

Additional components or additives, which may generally be known in the art, may also be included. Additives may include but are not limited to ultra-violet absorbing compounds, photo-initiators such as CGI 819, reactive tints, antimicrobial compounds, pigments, photochromic, release agents, combinations thereof and the like.

The method associated with these types of separators may also include receiving CGI 819; and then mixing with PVP, HEMA, EGDMA and IPA; and then curing the resulting mixture with a heat source or an exposure to photons. In some examples the exposure to photons may occur where the photons' energy is consistent with a wavelength occurring in the ultraviolet portion of the electromagnetic spectrum. Other methods of initiating polymerization generally performed in polymerization reactions are within the scope of the present invention.

Interconnects

Interconnects may allow current to flow to and from the battery in connection with an external circuit. Such interconnects may interface with the environments inside and outside the battery, and may cross the boundary or seal between those environments. These interconnects may be considered as traces, making connections to an external circuit, passing through the battery seal, and then connecting to the current collectors inside the battery. As such, these interconnects may have several requirements. Outside the battery, the interconnects may resemble typical printed circuit traces. They may be soldered to, or otherwise connect to, other traces. In an example where the battery is a separate physical element from a circuit board comprising an integrated circuit, the battery interconnect may allow for connection to the external circuit. This connection may be formed with solder, conductive tape, conductive ink or epoxy, or other means. The interconnect traces may need to survive in the environment outside the battery, for example, not corroding in the presence of oxygen.

As the interconnect passes through the battery seal, it may be of critical importance that the interconnect coexist with the seal and permit sealing. Adhesion may be required between the seal and interconnect in addition to the adhesion which may be required between the seal and battery package. Seal integrity may need to be maintained in the presence of electrolyte and other materials inside the battery. Interconnects, which may typically be metallic, may be known as points of failure in battery packaging. The electrical potential and/or flow of current may increase the tendency for electrolyte to "creep" along the interconnect. Accordingly, an interconnect may need to be engineered to maintain seal integrity.

Inside the battery, the interconnects may interface with the current collectors or may actually form the current collectors. In this regard, the interconnect may need to meet the requirements of the current collectors as described herein, or may need to form an electrical connection to such current collectors.

One class of candidate interconnects and current collectors is metal foils. Such foils are available in thickness of 25 microns or less, which make them suitable for very thin batteries. Such foil may also be sourced with low surface roughness and contamination, two factors which may be critical for battery performance. The foils may include zinc, nickel, brass, copper, titanium, other metals, and various alloys.

Current Collectors and Electrodes

Many of the current collector and electrode designs are envisioned to be formed by the deposition of metal films upon a sidewall, or by the use of metallic wires as substrates to form the current collectors and electrodes. Examples of these have been illustrated. Nevertheless, there may be some designs that utilize other current collector or electrode designs in a tube battery format.

In some examples of zinc carbon and Leclanche cells, the cathode current collector may be a sintered carbon rod. This type of material may face technical hurdles for thin electrochemical cells of the present invention. In some examples, printed carbon inks may be used in thin electrochemical cells to replace a sintered carbon rod for the cathode current collector, and in these examples, the resulting device may be formed without significant impairment to the resulting electrochemical cell. Typically, said carbon inks may be applied directly to packaging materials which may comprise polymer films, or in some cases metal foils. In the examples where the packaging film may be a metal foil, the carbon ink may need to protect the underlying metal foil from chemical degradation and/or corrosion by the electrolyte. Furthermore, in these examples, the carbon ink current collector may need to provide electrical conductivity from the inside of the electrochemical cell to the outside of the electrochemical cell, implying sealing around or through the carbon ink.

Carbon inks also may be applied in layers that have finite and relatively small thickness, for example, 10 to 20 microns. In a thin electrochemical cell design in which the total internal package thickness may only be about 100 to 150 microns, the thickness of a carbon ink layer may take up a significant fraction of the total internal volume of the electrochemical cell, thereby negatively impacting electrical performance of the cell. Further, the thin nature of the overall battery and the current collector in particular may imply a small cross-sectional area for the current collector. As resistance of a trace increases with trace length and decreases with cross-sectional area, there may be a direct tradeoff between current collector thickness and resistance. The bulk resistivity of carbon ink may be insufficient to meet the resistance requirement of thin batteries. Inks filled with silver or other conductive metals may also be considered to decrease resistance and/or thickness, but they may introduce new challenges such as incompatibility with novel electrolytes. In consideration of these factors, in some examples it may be desirable to realize efficient and high performance thin electrochemical cells of the present invention by utilizing a thin metal foil as the current collector, or to apply a thin metal film to an underlying polymer packaging layer to act as the current collector. Such metal foils may have significantly lower resistivity, thereby allowing them to meet electrical resistance requirements with much less thickness than printed carbon inks.

In some examples, one or more of the tube forms may be used as a substrate for electrodes and current collectors, or as current collectors themselves. In some examples, the metals of a tube form may have depositions made to their surfaces. For example, metal tube pieces may serve as a substrate for a sputtered current collector metal or metal stack. Exemplary metal stacks useful as cathode current collectors may be Ti—W (titanium-tungsten) adhesion layers and Ti (titanium) conductor layers. Exemplary metal stacks useful as anode current collectors may be Ti—W adhesion layers, Au (gold) conductor layers, and In (indium) deposition layers. The thickness of the PVD layers may be less than 500 nm in total. If multiple layers of metals are used, the electrochemical and barrier properties may need to be compatible with the battery. For example, copper may be electroplated on top of a seed layer to grow a thick layer of conductor. Additional layers may be plated upon the copper. However, copper may be electrochemically incompatible with certain electrolytes especially in the presence of zinc. Accordingly, if copper is used as a layer in the battery, it may need to be sufficiently isolated from the battery electrolyte. Alternatively, copper may be excluded or another metal substituted.

Wires made from numerous materials may also be used to form current collectors and/or substrates for electrodes. In some examples, the metal conductor may penetrate an insulator material such as glass or ceramic to provide an isolated electrical current collector contact. In some examples the wire may be made of titanium. In other examples, other base metals including but not limited to Aluminum, Tungsten, Copper, Gold, Silver, Platinum may be used and may have surface films applied.

Cathode Mixtures and Depositions

There may be numerous cathode chemistry mixtures that may be consistent with the concepts of the present invention. In some examples, a cathode mixture, which may be a term for a chemical formulation used to form a battery's cathode, may be applied as a paste, gel, suspension, or slurry, and may comprise a transition metal oxide such as manganese dioxide, some form of conductive additive which, for example, may be a form of conductive powder such as carbon black or graphite, and a water-soluble polymer such as polyvinylpyrrolidone (PVP) or some other binder additive. In some examples, other components may be included such as one or more of binders, electrolyte salts, corrosion inhibitors, water or other solvents, surfactants, rheology modifiers, and other conductive additives, such as, conductive polymers. Once formulated and appropriately mixed, the cathode mixture may have a desirable rheology that allows it to either be dispensed onto desired portions of the separator and/or cathode current collector, or squeegeed through a screen or stencil in a similar manner. In some examples, the cathode mixture may be dried before being used in later cell assembly steps, while in other examples, the cathode may contain some or all of the electrolyte components, and may only be partially dried to a selected moisture content.

The transition metal oxide may, for example, be manganese dioxide. The manganese dioxide which may be used in the cathode mixture may be, for example, electrolytic manganese dioxide (EMD) due to the beneficial additional specific energy that this type of manganese dioxide provides relative to other forms, such as natural manganese dioxide (NMD) or chemical manganese dioxide (CMD). Furthermore, the EMD useful in batteries of the present invention may need to have a particle size and particle size distribution that may be conducive to the formation of depositable or printable cathode mixture pastes/slurries. Specifically, the EMD may be processed to remove significant large particulate components that may be considered large relative to other features such as battery internal dimensions, separator thicknesses, dispense tip diameters, stencil opening sizes, or screen mesh sizes. Particle size optimization may also be used to improve performance of the battery, for example, internal impedance and discharge capacity.

Milling is the reduction of solid materials from one average particle size to a smaller average particle size, by crushing, grinding, cutting, vibrating, or other processes. Milling may also be used to free useful materials from matrix materials in which they may be embedded, and to concentrate minerals. A mill is a device that breaks solid materials into smaller pieces by grinding, crushing, or cutting. There may be several means for milling and many types of materials processed in them. Such means of milling may include: ball mill, bead mill, mortar and pestle, roller press, and jet mill among other milling alternatives. One example of milling may be jet milling. After the milling, the state of the solid is changed, for example, the particle size, the particle size disposition and the particle shape. Aggregate milling processes may also be used to remove or separate contamination or moisture from aggregate to produce "dry fills" prior to transport or structural filling. Some equipment may combine various techniques to sort a solid material into a mixture of particles whose size is bounded by both a minimum and maximum particle size. Such processing may be referred to as "classifiers" or "classification."

Milling may be one aspect of cathode mixture production for uniform particle size distribution of the cathode mixture ingredients. Uniform particle size in a cathode mixture may assist in viscosity, rheology, electroconductivity, and other properties of a cathode. Milling may assist these properties by controlling agglomeration, or a mass collection, of the cathode mixture ingredients. Agglomeration—the clustering of disparate elements, which in the case of the cathode mixture, may be carbon allotropes and transition metal oxides—may negatively affect the filling process by leaving voids in the desired cathode cavity as illustrated in FIGS. 11A-11J described in detail below.

Also, filtration may be another important step for the removal of agglomerated or unwanted particles. Unwanted particles may include over-sized particles, contaminates, or other particles not explicitly accounted for in the preparation process. Filtration may be accomplished by means such as filter-paper filtration, vacuum filtration, chromatography, microfiltration, and other means of filtration.

In some examples, EMD may have an average particle size of 7 microns with a large particle content that may contain particulates up to about 70 microns. In alternative examples, the EMD may be sieved, further milled, or otherwise separated or processed to limit large particulate content to below a certain threshold, for example, 25 microns or smaller.

The cathode may also comprise silver oxides, silver chlorides or nickel oxyhydroxide. Such materials may offer increased capacity and less decrease in loaded voltage during discharge relative to manganese dioxide, both desirable properties in a battery. Batteries based on these cathodes may have current examples present in industry and literature. A novel microbattery utilizing a silver dioxide cathode may include a biocompatible electrolyte, for example, one comprising zinc chloride and/or ammonium chloride instead of potassium hydroxide.

Some examples of the cathode mixture may include a polymeric binder. The binder may serve a number of functions in the cathode mixture. The primary function of the binder may be to create a sufficient inter-particle electrical network between EMD particles and carbon particles. A secondary function of the binder may be to facilitate mechanical adhesion and electrical contact to the cathode current collector. A third function of the binder may be to influence the rheological properties of the cathode mixture for advantageous dispensing and/or stenciling/screening. Still, a fourth function of the binder may be to enhance the electrolyte uptake and distribution within the cathode.

The choice of the binder polymer as well as the amount to be used may be beneficial to the function of the cathode in the electrochemical cell of the present invention. If the binder polymer is too soluble in the electrolyte to be used, then the primary function of the binder—electrical continuity—may be drastically impacted to the point of cell non-functionality. On the contrary, if the binder polymer is insoluble in the electrolyte to be used, portions of EMD may be ionically insulated from the electrolyte, resulting in diminished cell performance such as reduced capacity, lower open circuit voltage, and/or increased internal resistance.

The binder may be hydrophobic; it may also be hydrophilic. Examples of binder polymers useful for the present invention comprise PVP, polyisobutylene (PIB), rubbery triblock copolymers comprising styrene end blocks such as those manufactured by Kraton Polymers, styrene-butadiene latex block copolymers, polyacrylic acid, hydroxyethylcellulose, carboxymethylcellulose, fluorocarbon solids such as polytetrafluoroethylene, cements including Portland cement, among others.

A solvent may be one component of the cathode mixture. A solvent may be useful in wetting the cathode mixture, which may assist in the particle distribution of the mixture. One example of a solvent may be toluene. Also, a surfactant may be useful in wetting, and thus distribution, of the cathode mixture. One example of a surfactant may be a detergent, such as Triton™ QS-44 available from the Dow Chemical Company. Triton™ QS-44 may assist in the dissociation of aggregated ingredients in the cathode mixture, allowing for a more uniform distribution of the cathode mixture ingredients.

A conductive carbon may typically be used in the production of a cathode. Carbon is capable of forming many allotropes, or different structural modifications. Different carbon allotropes have different physical properties allowing for variation in electroconductivity. For example, the "springiness" of carbon black may help with adherence of a cathode mixture to a current collector. However, in energization elements requiring relatively low amounts of energy, these variations in electroconductivity may be less important than other favorable properties such as density, particle size, heat conductivity, and relative uniformity, among other properties. Examples of carbon allotropes include: diamond, graphite, graphene, amorphous carbon (informally called carbon black), buckminsterfullerenes, glassy carbon (also called vitreous carbon), carbon aerogels, and other possible forms of carbon capable of conducting electricity. One example of a carbon allotrope may be graphite.

In some examples the cathode may be deposited upon a tube wall or a wire form cathode collector. Tube walls and wires may be metallic in some examples and may have cathode chemicals such as manganese dioxide electrodeposited upon them. In other examples coatings of electrolytic manganese dioxide may be formed upon cathode collectors.

Anodes and Anode Corrosion Inhibitors

The anode for the tube battery of the present invention may, for example, comprise zinc. In traditional zinc-carbon batteries, a zinc anode may take the physical form of a can in which the contents of the electrochemical cell may be contained. For the battery of the present invention, a zinc can may be an example but there may be other physical forms of zinc that may prove desirable to realize ultra-small battery designs.

Electroplating of zinc is a process type in numerous industrial uses, for example, for the protective or aesthetic coating of metal parts. In some examples, electroplated zinc may be used to form thin and conformal anodes useful for batteries of the present invention. Furthermore, the electroplated zinc may be patterned in many different configurations, depending on the design intent. A facile means for patterning electroplated zinc may be processing with the use of a photomask or a physical mask. In the case of the photomask, a photoresist may be applied to a conductive substrate, the substrate on which zinc may subsequently be plated. The desired plating pattern may be then projected to the photoresist by means of a photomask, thereby causing curing of selected areas of photoresist. The uncured photoresist may then be removed with appropriate solvent and cleaning techniques. The result may be a patterned area of conductive material that may receive an electroplated zinc treatment. While this method may provide benefit to the shape or design of the zinc to be plated, the approach may require use of available photopatternable materials, which may have constrained properties to the overall cell package construction. Consequently, new and novel methods for patterning zinc may be required to realize some designs of thin microbatteries of the present invention.

The zinc mask may be placed and then electroplating of one or more metallic materials may be performed. In some examples, zinc may be electroplated directly onto an electrochemically compatible anode current collector foil such as brass. In alternate design examples where the anode side packaging comprises a polymer film or multi-layer polymer film upon which seed metallization has been applied, zinc, and/or the plating solutions used for depositing zinc, may not be chemically compatible with the underlying seed metallization. Manifestations of lack of compatibility may include film cracking, corrosion, and/or exacerbated $H_2$ evolution upon contact with cell electrolyte. In such a case, additional metals may be applied to the seed metal to affect better overall chemical compatibility in the system. One metal that may find particular utility in electrochemical cell constructions may be indium. Indium may be widely used as an alloying agent in battery grade zinc with its primary function being to provide an anti-corrosion property to the zinc in the presence of electrolyte. In some examples, indium may be successfully deposited on various seed metallizations such as Ti—W and Au. Resulting films of 1-3 microns of indium on said seed metallization layers may be low-stress and adherent. In this manner, the anode-side packaging film and attached current collector having an indium top layer may be conformable and durable. In some examples, it may be possible to deposit zinc on an indium-treated surface, the resulting deposit may be very non-uniform and nodular. This effect may occur at lower current density settings, for example, 20 amps per square foot (ASF). As viewed under a microscope, nodules of zinc may be observed to form on the underlying smooth indium deposit. In certain electrochemical cell designs, the vertical space allowance for the zinc anode layer may be up to about 5-10 microns thick, but in some examples, lower current densities may be used for zinc plating, and the resulting nodular growths may grow taller than the desired maximum anode vertical thickness. It may be that the nodular zinc growth stems from a combination of the high overpotential of indium and the presence of an oxide layer of indium.

In some examples, higher current density DC plating may overcome the relatively large nodular growth patterns of zinc on indium surfaces. For example, 100 ASF plating conditions may result in nodular zinc, but the size of the zinc nodules may be drastically reduced compared to 20 ASF plating conditions. Furthermore, the number of nodules may be vastly greater under 100 ASF plating conditions. The resulting zinc film may ultimately coalesce to a more or less uniform layer with only some residual feature of nodular growth while meeting the vertical space allowance of about 5-10 microns.

An added benefit of indium in the electrochemical cell may be reduction of $H_2$ formation, which may be a slow process that occurs in aqueous electrochemical cells containing zinc. The indium may be beneficially applied to one or more of the anode current collector, the anode itself as a co-plated alloying component, or as a surface coating on the electroplated zinc. For the latter case, indium surface coatings may be desirably applied in-situ by way of an electrolyte additive such as indium trichloride or indium acetate. When such additives may be added to the electrolyte in small concentrations, indium may spontaneously plate on exposed zinc surfaces as well as portions of exposed anode current collector.

Zinc and similar anodes commonly used in commercial primary batteries may typically be found in sheet, rod, and paste forms. The anode of a miniature, biocompatible battery may be of similar form, e.g. thin foil, or may be plated as previously mentioned. The properties of this anode may differ significantly from those in existing batteries, for example, because of differences in contaminants or surface finish attributed to machining and plating processes. Accordingly, the electrodes and electrolyte may require special engineering to meet capacity, impedance, and shelf life requirements. For example, special plating process parameters, plating bath composition, surface treatment, and electrolyte composition may be needed to optimize electrode performance.

Battery Architecture and Fabrication

Battery architecture and fabrication technology may be closely intertwined. As has been discussed in earlier sections of the present invention, a battery may have the following elements: cathode, anode, separator, electrolyte, cathode current collector, anode current collector, and tube form containment. In some examples, designs may have dual-use components, such as, using a metal package can or tube to double as a current collector. From a relative volume and thickness standpoint, these elements may be nearly all the same volume, except for the cathode. In some examples, the electrochemical system may require about two (2) to ten (10) times the volume of cathode as anode due to significant differences in mechanical density, energy density, discharge efficiency, material purity, and the presence of binders, fillers, and conductive agents.

Biocompatibility Aspects of Batteries

The batteries according to the present invention may have important aspects relating to safety and biocompatibility. In some examples, batteries for biomedical devices may need to meet requirements above and beyond those for typical usage scenarios. In some examples, design aspects may be considered in relation to stressing events. For example, the safety of an electronic contact lens may need to be considered in the event a user breaks the lens during insertion or removal. In another example, design aspects may consider the potential for a user to be struck in the eye by a foreign object. Still further examples of stressful conditions that may be considered in developing design parameters and constraints may relate to the potential for a user to wear the lens in challenging environments like the environment under water or the environment at high altitude in non-limiting examples.

The safety of such a device may be influenced by: the materials that the device is formed with or from; by the quantities of those materials employed in manufacturing the device; and by the packaging applied to separate the devices from the surrounding on- or in-body environment. In an example, pacemakers may be a typical type of biomedical device which may include a battery and which may be implanted in a user for an extended period of time. In some examples, such pacemakers may typically be packaged with welded, hermetic titanium enclosures, or in other examples, multiple layers of encapsulation. Emerging powered biomedical devices may present new challenges for packaging, especially battery packaging. These new devices may be much smaller than existing biomedical devices, for example, an electronic contact lens or pill camera may be significantly smaller than a pacemaker. In such examples, the volume and area available for packaging may be greatly reduced. An advantage of the limited volume may be that amounts of materials and chemicals may be so small as to inherently limit the exposure potential to a user to a level below a safety limit.

The tube based approach particularly when it includes hermetic seals may provide means to enhance biocompatibility. Each of the tube components may provide significant barrier to ingress and egress of materials. Further, with many of the hermetic sealing processes as have been described herein, a battery may be formed that has superior biocompatibility.

Contact Lens Skirts

In some examples, a preferred encapsulating material that may form an encapsulating layer in a biomedical device may include a silicone containing component. In an example, this encapsulating layer may form a lens skirt of a contact lens. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some examples, the ophthalmic lens skirt, also called an insert-encapsulating layer, that surrounds the insert may be comprised of standard hydrogel ophthalmic lens formulations. Exemplary materials with characteristics that may provide an acceptable match to numerous insert materials may include, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone containing components include compounds of Formula I

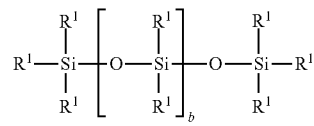

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some examples between one and 3 $R^1$ comprise monovalent reactive groups.

As used herein "monovalent reactive groups" are groups that may undergo free radical and/or cationic polymerization. Non-limiting examples of free radical reactive groups include (meth)acrylates, styryls, vinyls, vinyl ethers, C1-6alkyl(meth)acrylates, (meth)acrylamides, C1-6alkyl (meth)acrylamides, N-vinyllactams, N-vinylamides, C2-12alkenyls, C2-12alkenylphenyls, C2-12alkenylnaphthyls, C2-6alkenylphenylC1-6alkyls, O-vinylcarbamates and O-vinylcarbonates. Non-limiting examples of cationic reactive groups include vinyl ethers or epoxide groups and mixtures thereof. In one embodiment, the free radical reactive groups comprises (meth)acrylate, acryloxy, (meth)acrylamide, and mixtures thereof.

Suitable monovalent alkyl and aryl groups include unsubstituted monovalent C1 to C16alkyl groups, C6-C14 aryl groups, such as substituted and unsubstituted methyl, ethyl, propyl, butyl, 2-hydroxypropyl, propoxypropyl, polyethyleneoxypropyl, combinations thereof and the like.

In one example, b is zero, one R1 is a monovalent reactive group, and at least 3 R1 are selected from monovalent alkyl groups having one to 16 carbon atoms, and in another example from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl] propoxy]propyl ester ("SiGMA"), 2-hydroxy-3-methacryloxypropyloxypropyl-tris (trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another example, b is 2 to 20, 3 to 15 or in some examples 3 to 10; at least one terminal R1 comprises a monovalent reactive group and the remaining R1 are selected from monovalent alkyl groups having 1 to 16 carbon atoms, and in another embodiment from monovalent alkyl groups having 1 to 6 carbon atoms. In yet another embodiment, b is 3 to 15, one terminal R1 comprises a monovalent reactive group, the other terminal R1 comprises a monovalent alkyl group having 1 to 6 carbon atoms and the remaining R1 comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another example, b is 5 to 400 or from 10 to 300, both terminal R1 comprise monovalent reactive groups and the remaining R1 are independently selected from monovalent alkyl groups having 1 to 18 carbon atoms, which may have ether linkages between carbon atoms and may further comprise halogen.

In one example, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four R1 comprises a vinyl carbonate or carbamate of the formula:

$$\underset{H}{H_2C}=\underset{\underset{R}{|}}{C}-(CH_2)_q-O-\underset{\underset{}{||}}{\overset{O}{C}}-Y \qquad \text{Formula II}$$

wherein: Y denotes O—, S— or NH—;

R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and $$H_2C=\underset{H}{\overset{O}{\overset{||}{C}}}-OCO(CH_3)_4-\underset{\underset{CH_3}{|}}{\overset{CH_3}{\overset{|}{Si}}}-O-\left[\underset{\underset{CH_3}{|}}{\overset{CH_3}{\overset{|}{Si}}}-O\right]_{25}-\underset{\underset{CH_3}{|}}{\overset{CH_3}{\overset{|}{Si}}}-(CH_2)_4OCO-\underset{H}{\overset{O}{\overset{||}{C}}}=CH_2$$

Where biomedical devices with modulus below about 200 are desired, only one R1 shall comprise a monovalent reactive group and no more than two of the remaining R1 groups will comprise monovalent siloxane groups.

Another class of silicone-containing components includes polyurethane macromers of the following formulae:

(\*D\*A\*D\*G)a\*D\*D\*E1;

E(\*D\*G\*D\*A)a\*D\*G\*D\*E1 or;

E(\*D\*A\*D\*G)a\*D\*A\*D\*E1    Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

\. denotes a urethane or ureido linkage;

a is at least 1;

A denotes a divalent polymeric radical of formula:

$$—(CH_2)_y—\left[\underset{\underset{R^{11}}{|}}{\overset{R^{11}}{\overset{|}{SiO}}}\right]_p—\underset{\underset{R^{11}}{|}}{\overset{R^{11}}{\overset{|}{Si}}}—(CH_2)_y— \qquad \text{Formula VII}$$

R11 independently denotes an alkyl or fluoro-substituted alkyl group having 1 to 10 carbon atoms, which may contain ether linkages between carbon atoms; y is at least 1; and p provides a moiety weight of 400 to 10,000; each of E and E1 independently denotes a polymerizable unsaturated organic radical represented by formula:

$$R^{13}CH=\underset{\underset{R^{12}}{|}}{C}-(CH_2)_w-(X)_x-(Z)_z-(Ar)_y-R^{14}- \qquad \text{Formula VIII}$$

wherein: R12 is hydrogen or methyl; R13 is hydrogen, an alkyl radical having 1 to 6 carbon atoms, or a —CO—Y—R15 radical wherein Y is —O—, Y—S— or —NH—; R14 is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX

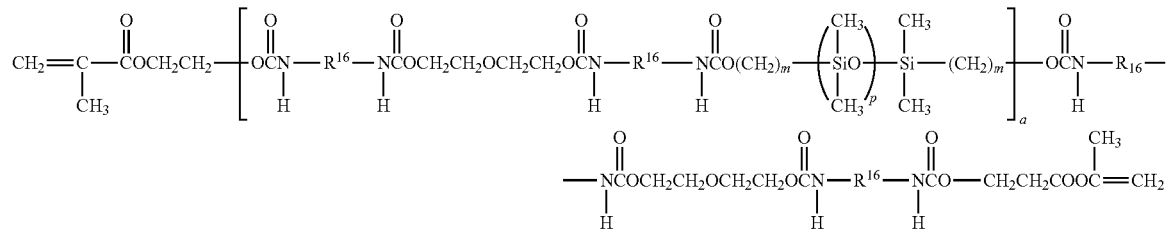

wherein R16 is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

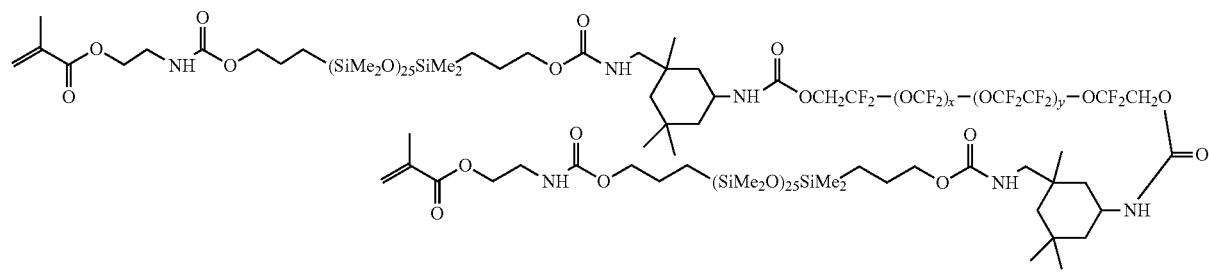

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. In some examples, the polymer backbone may have zwitterions incorporated into it. These zwitterions may exhibit charges of both polarity along the polymer chain when the material is in the presence of a solvent. The presence of the zwitterions may improve wettability of the polymerized material. In some examples, any of the foregoing polysiloxanes may also be used as an encapsulating layer in the present invention.

Electroless Plating of Metallic Layers to Seal Battery Structures

Metal plating has great utility in many applications, for aesthetic purposes in jewelry or metal appliances, adding corrosion resistance to industrial machinery or surfaces of appliances or materials, or even to add electrical conductivity to a surface, as non-limiting examples. In a biocompatible energization element, plating which surrounds the battery body may be useful to form a sealed barrier to material ingress or egress. There may be numerous methods to plate a metal layer upon a battery structure, but the basic premise may involve depositing a coating or layer of a metallic material on the surface of the exterior surfaces of the battery.

Metal plating may be done with numerous types of metals, including copper, nickel, platinum, rhodium, and many others. The result of metal plating may be the depositing of metals on numerous types of other materials, including but not limited to, other metals, semiconductors, or plastics.

Typical examples of metal plating methods may include electroplating and electroless plating; both involve coating a material with a layer of metal. However, electroplating may involve an induced electrical charge on the material to be coated, whereas electroless plating may not involve electricity, and may involve a chemical reaction that deposits the metal.

Electroplating may involve numerous steps to achieve a desired finish, consistent thickness of deposited material, and other qualities desired in a successful coating. In some examples, a piece may first be thoroughly pre-treated, to ensure effective plating. Pre-treating steps may include, but are not limited to polishing, masking, etching, washing, steam cleaning, rinsing, ultrasonic washing, or electrocleaning as non-limiting examples. In some examples, the pre-treatment may remove oil, grease, or other contaminants from the surface of a piece to be coated.

After successful pre-treatment, the object to be plated may be placed in a solution bath containing the metal in ionic form to be deposited. Typically, electroplating methods may involve inducing a positive electrical charge to the solution bath, and a negative electrical charge to the object to be plated. This difference in electrical charge may induce an attractive electrical force between the metal particles in the solution bath and the plated object. This attractive force may chemically modify the ionic state and bind the metal particles from the solution bath to the object, coating its surface.

Depending on the composition of the material to be plated and the solution bath, certain conditions including but not limited to, voltage, pH of the solution bath, concentration of metal in the solution, duration of plating and ambient temperature, should preferably be maintained to ensure effective plating. Adjusting these conditions may change various aspects of the plating, including but not limited to the finish of the resulting metal surface, the color of the deposited metal, the speed of deposition, or the thickness of the deposited metal. Other ambient conditions, such as air bubbles or contaminants in the solution bath, may also effect the resulting finish; these imperfections may be resolved by agitating the bath or applying a carbon treatment to the bath, as non-limiting examples. In some examples, it may be important to reduce all causes of imperfections in a plated surface upon a biocompatible energization element; since such imperfections may reduce the effectiveness of a seal.

Various forms of post-treating may also be necessary to ensure success in electroplating, including but not limited to rinsing, steam cleaning, heat drying or other methods.

Electroless plating may involve numerous steps to achieve a desired finish, consistent thickness of deposited material, and other qualities desired in a successful coating. Electroless plating may have the same requirements relating to coating and sealing of a biocompatible energization element as have been discussed relating to electroplating. First, a piece to be coated may be thoroughly pre-treated, to ensure effective plating. Pre-treating steps may include, but are not limited to cleaning. Cleaning may help remove contaminants and/or debris remaining from any prior processing steps of the object to be coated, as well as oil, grease, or other contaminants from the surface of a piece to be coated. Cleaning may be achieved with acids or other types of cleaning solutions; in choosing the proper cleaning solution, it may be important to consider what material or debris is to be removed, the temperature at which the cleaned piece (and thus solution) are kept during cleaning, the desired concentration of the cleaning solution, how much mechanical work (agitation, etc.) may be required with the cleaner, as well as other possible aspects.

Pre-treating steps may also include etching, masking, rinsing, drying, and submersing the object to be plated in an activator pre-dip solution as well as an activator solution, as non-limiting examples. Etching may involve using a chemical and/or mechanical means, as non-limiting examples, to etch a profile into a work object to be plated, that will serve as a prescribed location for plating. A pre-dip solution may contain ions common to those of the activator solution, which will prepare the work piece for the actual plating; this pre-dip solution may be typically designed to be applied to the work piece and not rinsed off before it is added to the activator solution. A pre-dip solution may be less sensitive to metal ion contamination than an accompanying activator solution. There may be numerous advantages for the use of a pre-dip solution including in a non-limiting sense a result that is less expensive, and may save the activator solution from metal ion contamination, to help the process be more efficient create results of higher quality.

After the pre-dip, an activator solution may be applied to the work piece. An activator may contain certain ions held in a reduced state by other ions in solution; in practice, the reduced ions may be mechanically held to the bonding surface, which act as a catalyst for the chemical reaction that will facilitate electroless plating. While a sufficient layer of activator solution on the surface of the work piece is important to catalyze the electroless plating process, it may be important to note that too thick a layer of activator solution may possibly act as a barrier to proper adhesion of the plated metal, and should be avoided.

Pre-treating steps may also include a post-activation step, or acceleration as it may also commonly be called. This step may serve to enable the activating species, deposited from the activator solution in the pre-dip step, to be as 'active' as possible, prior to the actual electroless plating step. This step may allow the activating species to interact more readily with the electroless plating solution in the actual plating step; not only may this decrease the initiation time for the electroless plating reaction, it may also minimize the potential of the activating species contaminating the electroless plating solution, increasing the quality of the plating result. If this post-activation step is left out, the activator solution deposited on the work piece may contain marginally adherent species, that may result in contamination of the electroless plating solution and may prolong the initiation of the electroless deposition reaction. In some examples, post-activating solutions may be acidic, and may act to remove metal oxides that can form on the work object surfaces due to rinsing steps between the activator and post-activator; while this is good for the work object, it may serve to contaminate the post-activator, and the solution bath may need to be replenished after it becomes overly concentrated with these metals or other contaminants.

After pre-treatment, a work object may be submersed in a chemical bath, containing the following possible ingredients as non-limiting examples: metal salts (of the metal desired for deposition), a reducing agent, alkaline hydroxide, chelating agents, stabilizers, brighteners, and optionally wetting agents. The reducing agent and hydroxide ions may provide the reducing force necessary for the deposition of the metal contained within the solution bath. The deposition reaction may be initiated by the catalytic species that may have been applied to the surface of the work object during the activator step. Typical electroless plating bath choices may depend on several factors, including but not limited to temperature, desired plating speed, desired plating thickness, and metal concentration (and thus repeatability of the plating reaction for multiple work objects in a single bath, although this repeatability may be seen to depend on many other factors as well).

Improved Mechanical Strength Through Electroless Plating

In some examples, a desirable solution for improving mechanical strength may involve electroless plating as a technique for creating a conformal barrier coating. Principles of electroless plating have been discussed herein. Electroless plating may deposit a conformal metal layer onto a conducting or nonconductive coating. Electroless plating baths have been developed for depositing metals such as nickel, copper, and tin onto plastic surfaces. The electroless plated metal may then be further plated using electroless plating or electroplating with a wide variety of metals, including nickel, copper, tin, gold, silver, cadmium, and rhodium. In some cases, because of cost, corrosion, and/or mechanical concerns, it may be desirable to use a layered structure incorporating more than one electroplate layer.

The coating may be made arbitrarily thick, and may mechanically reinforce the battery in addition to acting as a barrier. This mechanical reinforcement may force hydrogen out the sides of the cell, reducing or eliminating bulging due to hydrogen gas generation during zinc corrosion. To avoid the creation of a short circuit between the battery terminals due to plating, it may be necessary to mask one or both terminals using a nonconductive material during the plating process.

In some examples a layer may be formed with electroless plating where electroless plating and/or electroplating may be used to create a roughly 1 mil (25 microns) conformal copper coating on them. Platers' tape may be used to mask both terminals of these batteries during plating to avoid short circuiting the batteries during the plating processing.

The tape may next be removed from the terminals, and then the batteries may be aged at room temperature at 50% relative humidity.

Plastic Tube Batteries

Electroless plating of sealing layers may allow tube form batteries which are comprised of plastic tubes to be formed in a usable manner. Referring to FIGS. 11A-11F an illustration of formation of a plastic based tube form battery is illustrated. A plastic tube 1110 which may comprise polyethylene or a mylar type composite of plastic and metal layers is shown in FIG. 11A. It may be cut to a desired length as illustrated in FIG. 11B, or in other examples may be deformed by melting or surrounding in other formed tubes to be curved in shape. In some examples, a flat form plastic or mylar piece may be rolled into a tube during the processing of a tube form battery. As is illustrated in following discussion, the plastic form tube may be shaped in a later processing step.

In FIG. 11C an example of a metal wire electrical contact, which may be an anode contact 1121 is illustrated. In some examples, the metal wire may be a zinc wire. In other examples, it may be a wire of another metal such as brass which may be coated with zinc 1120. The wire may be surrounded and sealed to a sealing material 1122. In the present invention, numerous types of sealing are discussed, many examples of which are consistent with the sealing material 1122 illustrated.

In FIG. 11D another metal wire 1130 may be used to form a cathode contact. In some examples the metal wire may be a titanium wire. The wire may have a deposit of cathode material 1131 surrounding it. Another sealing material 1132 may surround the cathode wire 1130.

Referring to FIG. 11E the tube 1110 may have a wick 1141 that may be a polyolefin film or a cellulosic film. In some examples, it may be a cellulosic thread spanning the region of the anode to the region of the cathode. The wick 1141 may be positioned into a volume of electrolyte 1140 that may be placed into the tube at a later processing step.

Proceeding to FIG. 11F, the various components illustrated in FIGS. 11E, 11D and 11C may be assembled to form a tubular form battery. The seals between the sealing material 1122 and the tube 1110 and the sealing material 1132 and the tube 1110 may comprise numerous types of seals as discussed in sections following. In some examples the wick 1141 may be a full separator or a plug of separator material which may keep more densely packed battery chemicals separated as opposed to physical separation as illustrated in FIGS. 11A-11F.

In some examples, metal endcaps may be added as a design variation. The two wire leads may be embedded in a tubular shaped insulating adhesive body at either end. The tubular shaped adhesive may be contained partly within the tubular insulating container of the battery and may also project partially beyond the battery container. In some examples, adhesives may adhere and seal the wire leads and the insulating container. The insulating adhesive may contain the battery fluids and prevent leakage of fluids to the exterior. The adhesive may be a thermoset, thermoplastic or combination of the two.

In some examples, there may be a fill port or a fill port location reserved along the body of the plastic tube. After the battery is assembled, a fill port may be cut into the fill port location and the battery may be filled with electrolyte. In some examples the electrolyte may be an aqueous solution such as a solution of $ZnCl_2$. In some other examples, the electrolyte may be a polymer electrolyte. Different electrolyte options are discussed previously may be used.

Plating Biocompatible Batteries

Any of various tube form batteries may be further processed to electrolessly plate barrier films to the structure of the battery. In an example, a fully formed plastic tubular form battery may be sealed using electroless deposition followed by electroplating. In a non-limiting example the battery structure of FIG. 11F may be further processed with electroplating. As illustrated in a top down view of 11G the plastic battery 1150 may be bent into a curved form with a cathode contact 1152 and an anode contact 1153. The battery form is illustrated in cross section in FIG. 11H. The cross section is illustrated across the region indicated by the dotted line 1151.

Figure 11G:
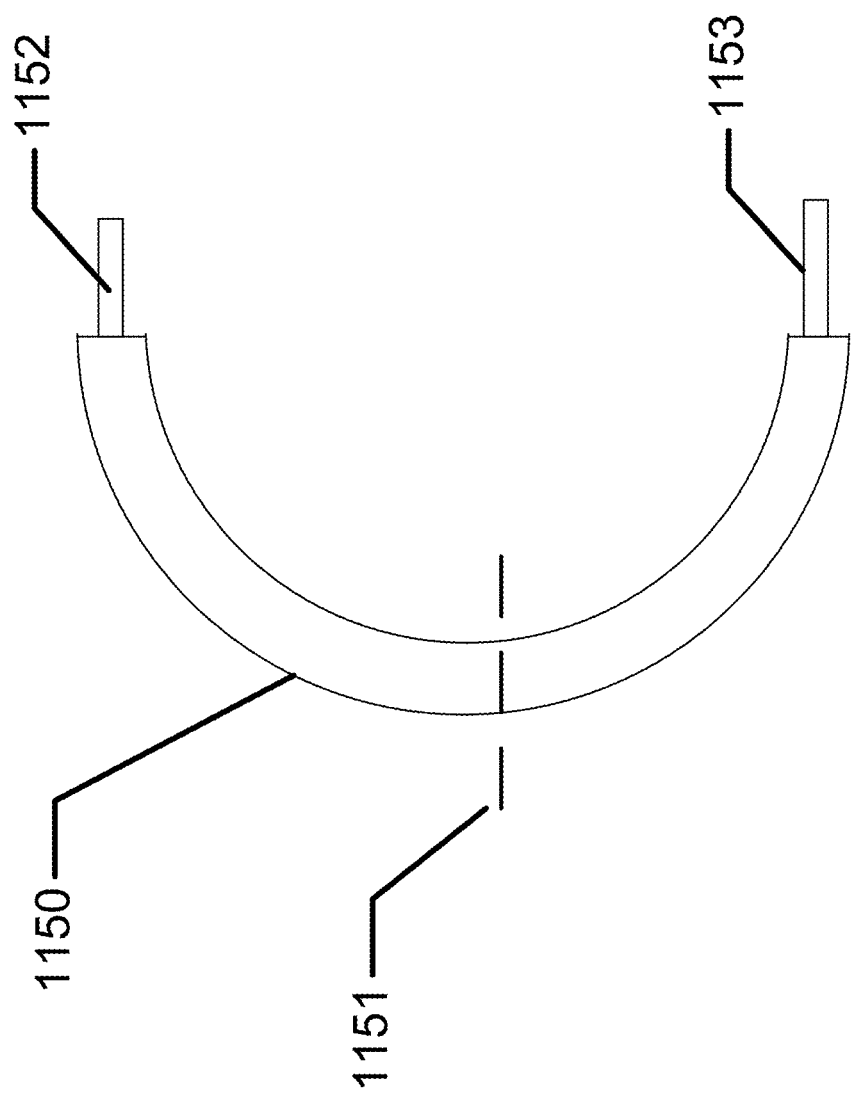
FIG. 11G illustrates a top view of an exemplary fully formed tubular form where the tube is shaped into a semicircular form.
Figure 11H:
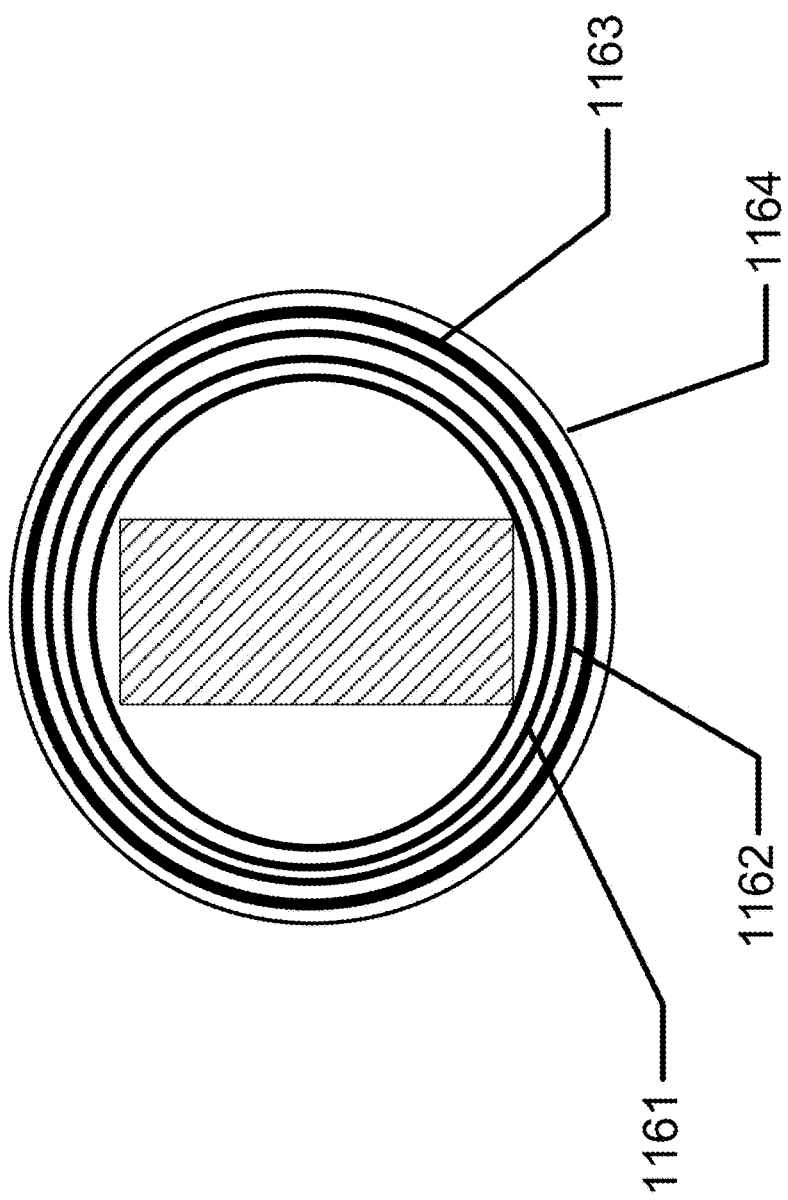
FIG. 11H illustrates a cross section of a plated fully formed tubular form battery example with various plated layers.

The tube form surface may be cleaned and treated with acid wash pre-dip to remove contaminates such as residual slurry. Other washes and cleans may include RCA type cleans, SC1 and SC2 type peroxide based cleans, hydrofluoric acid, sulfuric acid and combinations of acids. An accelerator or sensitizer may include proprietary formulations such as a "Type C" solution from Transene Company. An activator may next be used to treat the surface. As a non-limiting example a "Type D" solution from Transcene Company may be used. Referring to FIG. 11H, the result of this treating is illustrated as layer 1161 on the fully formed biocompatible energization element of FIG. 11F.

Next, the pretreated surface may be immersed into baths for electroless plating, in this example, copper. The battery body that has been pretreated and activated may now be immersed in a mixture of Transene Company "Type A and Type B" electroless copper bath solution at elevated temperature of roughly 40 C for a time to form a number of microns of deposition. The resulting deposition is illustrated as layer 1162. In some examples, the surface may be post washed in acids to stabilize the surface.

In some examples, a thicker layer of deposition, perhaps 10 or more microns thick of copper may be deposited upon the electroless layer using copper bath electroplating. The resulting layer of copper is illustrated as layer 1163. In some examples, an electroplating treatment of rhodium may follow the electroplated copper layer as layer 1164. Rhodium may stabilize and protect the copper surface; therefore, a thin layer may be added as the top surface in some examples.

If an entire battery element were plated in a copper layer, the two contacts of the battery would be shorted and the battery would be non-functional. Therefore, one or both contacts of the battery can be protected before plating to prevent formation around the contacts and isolate the contact. Referring to FIG. 11J an exemplary top view of a laminate structure battery before plating is illustrated on the battery of FIG. 11G with the anode connection 1152 and the cathode connection 1153. A protective film, such as plater's tape' may be placed around the anode contact at location 1171 and the cathode contact at location 1172. The remaining surface 1170 of the battery may be coated with the electroless and electroplating layers as illustrated in FIG. 11A. The fact that the contact region may have non-plated surface of the laminate structure may not be an issue for sealing the battery. In some examples, the contacts may be made long enough so that there is a relatively large seal near the contact. In a different sense, operation of a primary battery may result in the generation of gases such as hydrogen gas. The presence of a region around one or more of the contacts which is not as well sealed may be advantageous since it may create a path that may allow generated gases to slowly dissipate through.

The biocompatible batteries may be used in biocompatible devices such as, for example, implantable electronic devices, such as pacemakers and micro-energy harvesters, electronic pills for monitoring and/or testing a biological function, surgical devices with active components, ophthalmic devices, microsized pumps, defibrillators, stents, and the like.

Specific examples have been described to illustrate sample embodiments for the cathode mixture for use in biocompatible batteries. These examples are for said illustration and are not intended to limit the scope of the claims in any manner. Accordingly, the description is intended to embrace all examples that may be apparent to those skilled in the art.

What is claimed is:

1. A battery comprising:
    an anode current collector, wherein the anode current collector is a first metallic tube closed on a first end;
    an anode, wherein the anode chemistry is contained within the first metallic tube;
    a cathode current collector, wherein the cathode current collector is a second metallic tube closed on a second end;
    a cathode, wherein the cathode chemistry is contained within the second metallic tube;
    a ceramic tube with a first sealing surface that sealably interfaces with the first metallic tube and a second sealing surface that sealably interfaces with the second metallic tube; and
    a sealing material located in a gap between the first sealing surface and first metallic tube, wherein the sealing material comprises a first layer comprising molybdenum and manganese particles in a mixture with ceramic powders which is then plated with a metallic film.

2. The battery of claim 1 wherein the sealing material located in the gap between the first sealing surface and the first metallic tube comprises an epoxy adhesive.

3. The battery of claim 1 wherein the metallic film comprises nickel.

4. The battery of claim 1 wherein the sealing material located in the gap between the first sealing surface and the first metallic tube comprises a first layer of a PVD deposited metallic film.

5. The battery of claim 4 wherein the metallic film comprises titanium.

6. The battery of claim 5 wherein a noble metallic film is additionally deposited upon the PVD deposited metallic film.

7. The battery of claim 1 wherein the sealing material located in the gap between the first sealing surface and the first metallic tube comprises a plurality of thin layers of metallic films, wherein a first thin layer of metallic film is deposited upon a second layer of metallic film, wherein the first thin layer of metallic film is chemically reactive with the second layer of metallic film releasing energy to rapidly heat the layers, and wherein the chemical reaction is activated by an energetic pulse of energy.

8. The battery of claim 7 wherein the energetic pulse comprises photons.

9. The battery of claim 7 wherein the energetic pulse comprises electrons.

10. The battery of claim 7 wherein the energetic pulse comprises thermal energy.

11. The battery of claim 1 wherein the sealing material located in the gap between the first sealing surface and the first metallic tube comprises a conventional solder alloy base with an addition of titanium, wherein the titanium reacts with surface materials of the ceramic upon exposure to ultrasonic energy.

* * * * *